US012596258B2

(12) United States Patent
Komura et al.

(10) Patent No.: US 12,596,258 B2
(45) Date of Patent: Apr. 7, 2026

(54) DISPLAY DEVICE

(71) Applicant: Magnolia White Corporation, Tokyo (JP)

(72) Inventors: Shinichi Komura, Tokyo (JP); Kazutaka Nagaoka, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 384 days.

(21) Appl. No.: 18/461,046

(22) Filed: Sep. 5, 2023

(65) Prior Publication Data
US 2024/0077731 A1 Mar. 7, 2024

(30) Foreign Application Priority Data

Sep. 5, 2022 (JP) ................................. 2022-140771

(51) Int. Cl.
| | |
|---|---|
| *G02B 27/01* | (2006.01) |
| *G02F 1/01* | (2006.01) |
| *G02F 1/1335* | (2006.01) |
| *G02F 1/13363* | (2006.01) |
| *G02F 1/1343* | (2006.01) |
| *G02F 1/1347* | (2006.01) |

(52) U.S. Cl.
CPC ....... *G02B 27/0172* (2013.01); *G02F 1/0136* (2013.01); *G02F 1/133528* (2013.01); *G02F 1/133536* (2013.01); *G02F 1/133638* (2021.01); *G02F 1/13439* (2013.01); *G02F 1/13471* (2013.01); *G02B 2027/0174* (2013.01)

(58) Field of Classification Search
CPC ............... G02B 27/0172; G02F 1/0136; G02F 1/133528; G02F 1/133536; G02F 1/133638; G02F 1/13439; G02F 1/13471
See application file for complete search history.

(56) References Cited

U.S. PATENT DOCUMENTS

| | | | |
|---|---|---|---|
| 6,421,183 B1 | 7/2002 | Ophey | |
| 10,067,343 B2 * | 9/2018 | Yoshida | ............ G02F 1/133514 |
| 2001/0028332 A1 | 10/2001 | Roest | |
| 2018/0180889 A1 | 6/2018 | Lee et al. | |
| 2019/0079234 A1 | 3/2019 | Takagi et al. | |
| 2019/0265493 A1 | 8/2019 | Takagi et al. | |
| 2019/0265494 A1 | 8/2019 | Takagi et al. | |

(Continued)

FOREIGN PATENT DOCUMENTS

| | | |
|---|---|---|
| JP | 2003-504663 A | 2/2003 |
| JP | 2003-529795 A | 10/2003 |

(Continued)

*Primary Examiner* — Tracie Y Green
(74) *Attorney, Agent, or Firm* — Maier & Maier, PLLC

(57) ABSTRACT

According to one embodiment, a display device includes an illumination device, a display panel opposed, a first retardation film, a holographic optical element, a second retardation film, a reflection polarizer spaced apart from the holographic optical element, and configured to transmit first linearly polarized light and reflect second linearly polarized light orthogonal to the first linearly polarized light, and a polarization conversion element located between the second retardation film and the reflection polarizer, and configured to maintain a polarization direction of the display light and rotate a polarization direction of external light transmitted through the light guide.

15 Claims, 20 Drawing Sheets

(56)         References Cited

U.S. PATENT DOCUMENTS

| 2021/0215979 | A1* | 7/2021 | Wang | ................ | G02F 1/133634 |
| 2021/0223634 | A1* | 7/2021 | Zhou | ................ | G02F 1/133531 |
| 2023/0204968 | A1* | 6/2023 | Sato | ................. | G02B 27/0172 |
| | | | | | 359/489.01 |

FOREIGN PATENT DOCUMENTS

| JP | 2018-106160 | A | 7/2018 |
| JP | 2019-53152 | A | 4/2019 |
| JP | 2019-148626 | A | 9/2019 |
| JP | 2019-148627 | A | 9/2019 |

* cited by examiner

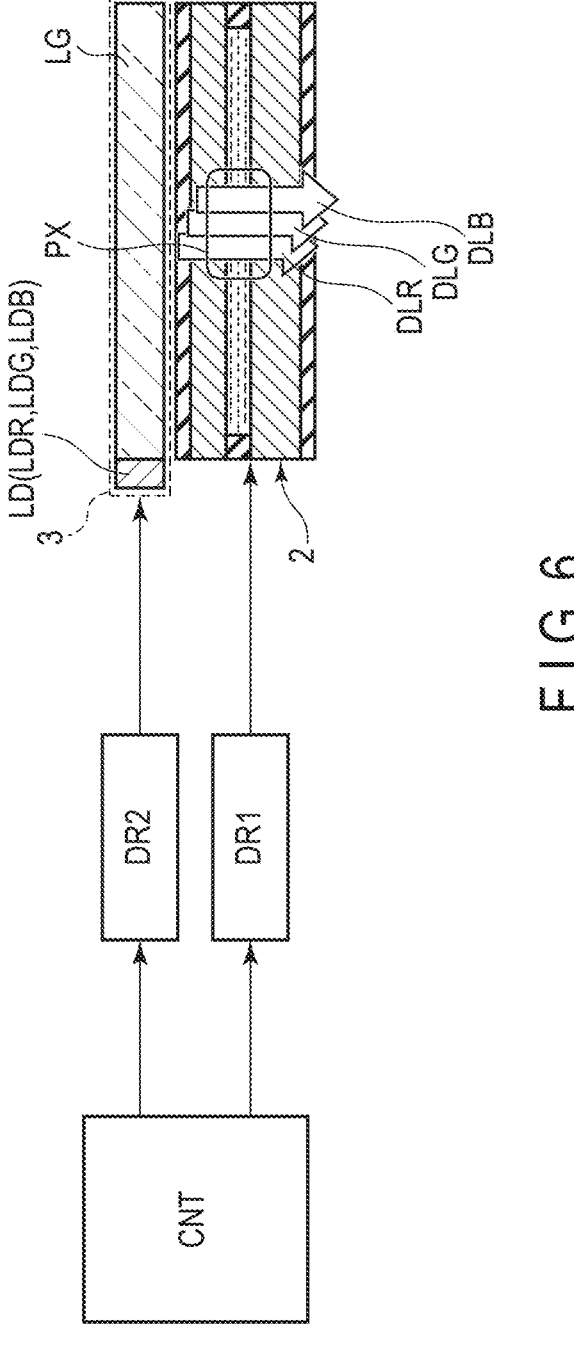
F I G. 6

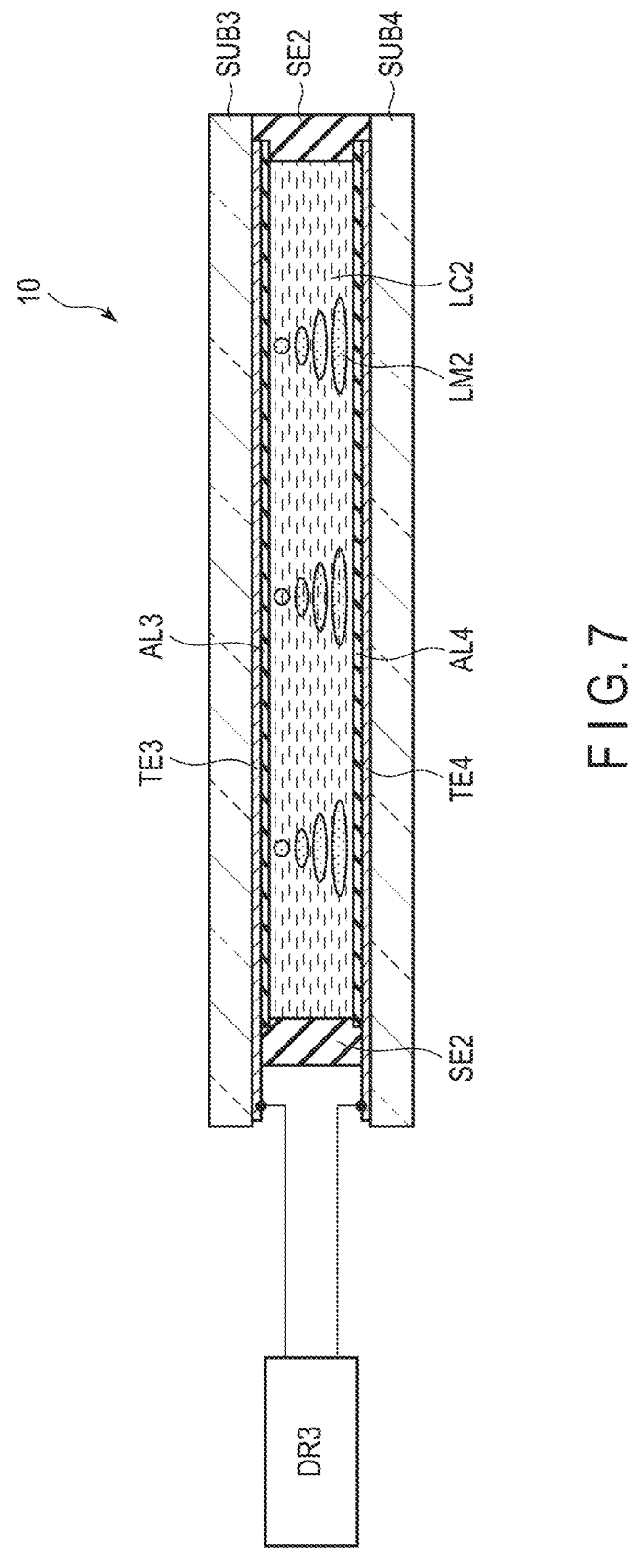
F I G. 7

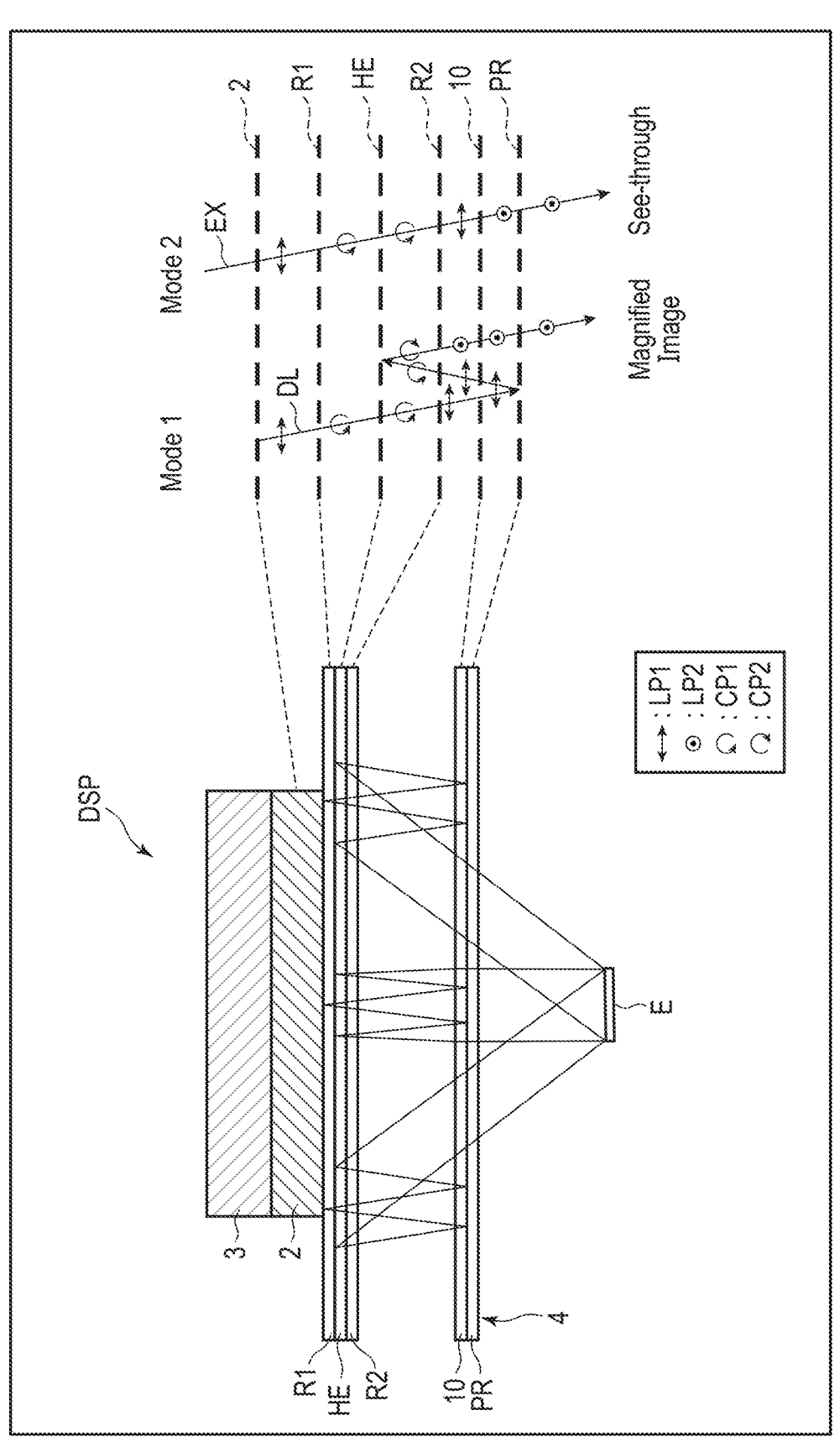
F I G. 8

| | Mode1 | Mode2 |
|---|---|---|
| 3 | ON (Turn-on) | OFF (Turn-off) |
| 2 | ON (Display) | OFF (Transmission) |
| 10 | ON (Non-conversion) | OFF (Conversion) |

FIG. 9

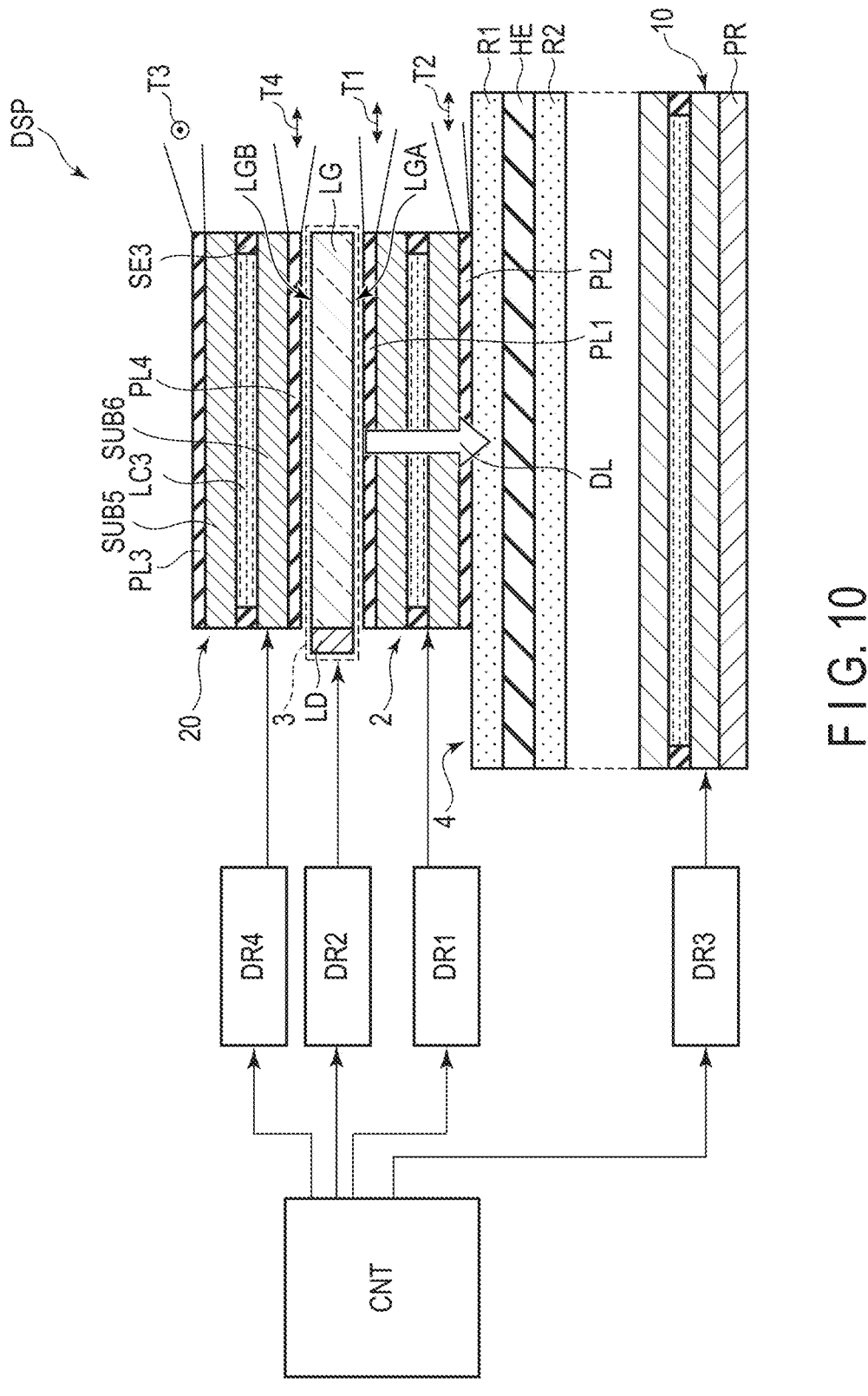
F I G. 10

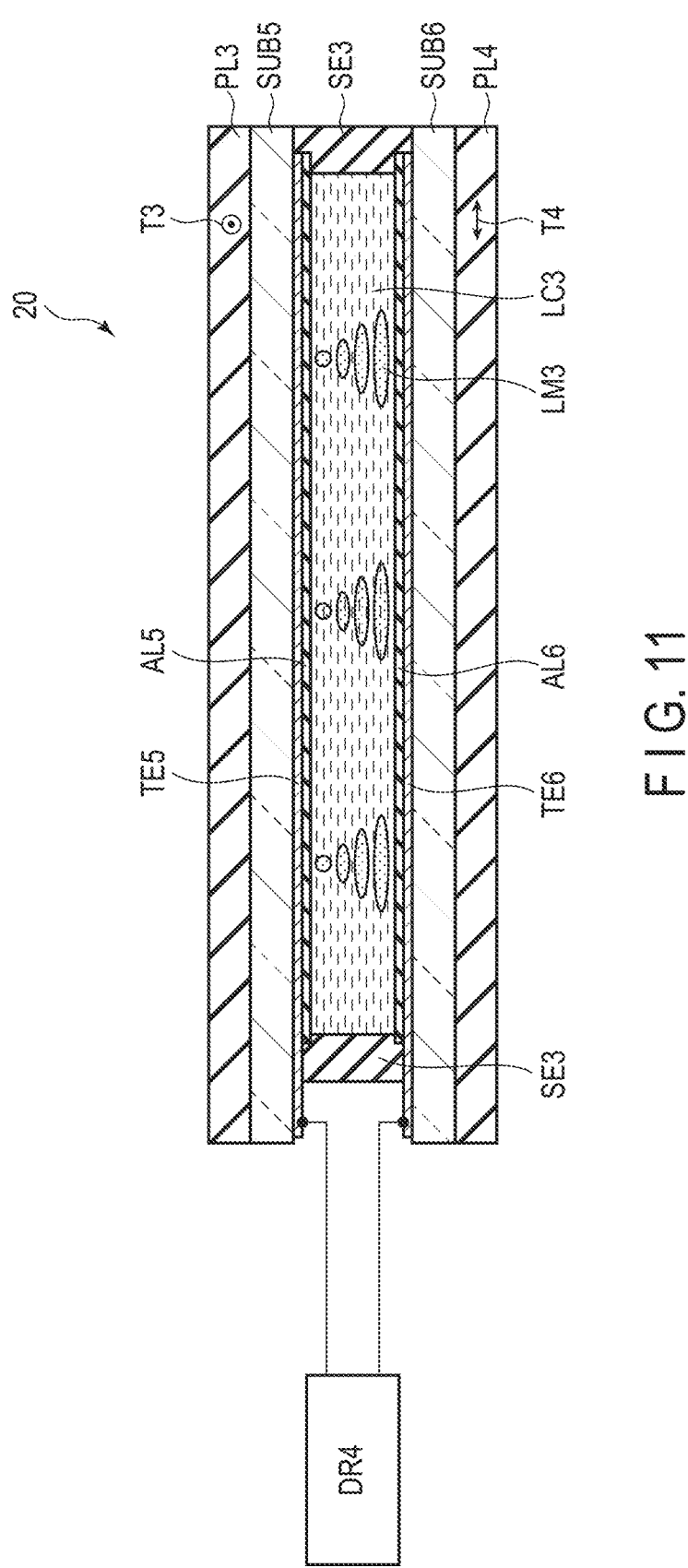
F I G. 11

|  | Mode1 | Mode2 |
|---|---|---|
| 20 | ON (Non-transmission) | OFF (Transmission) |
| 3 | ON (Turn-on) | OFF (Turn-off) |
| 2 | ON (Display) | OFF (Transmission) |
| 10 | ON (Non-conversion) | OFF (Conversion) |

F I G. 13

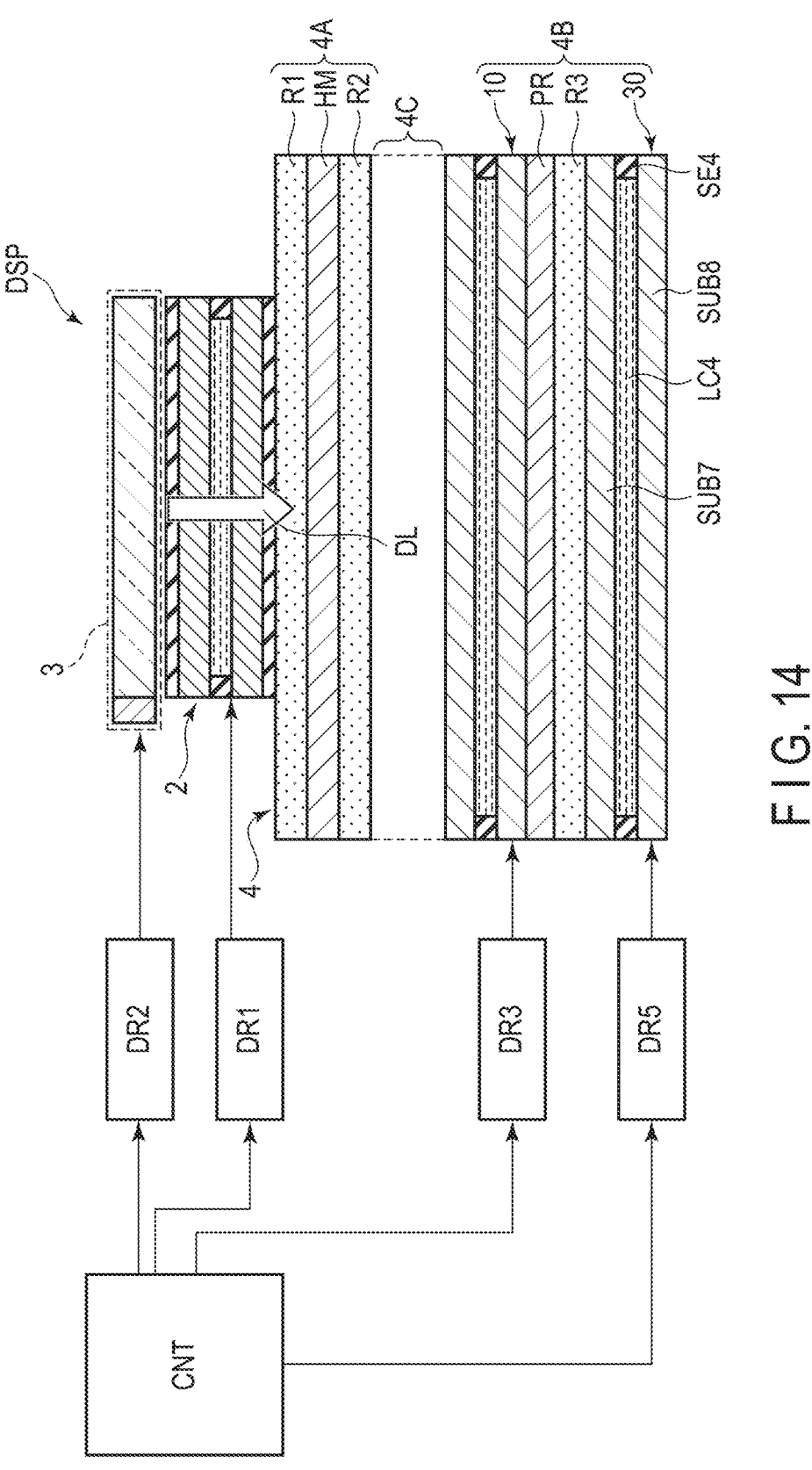
F I G. 14

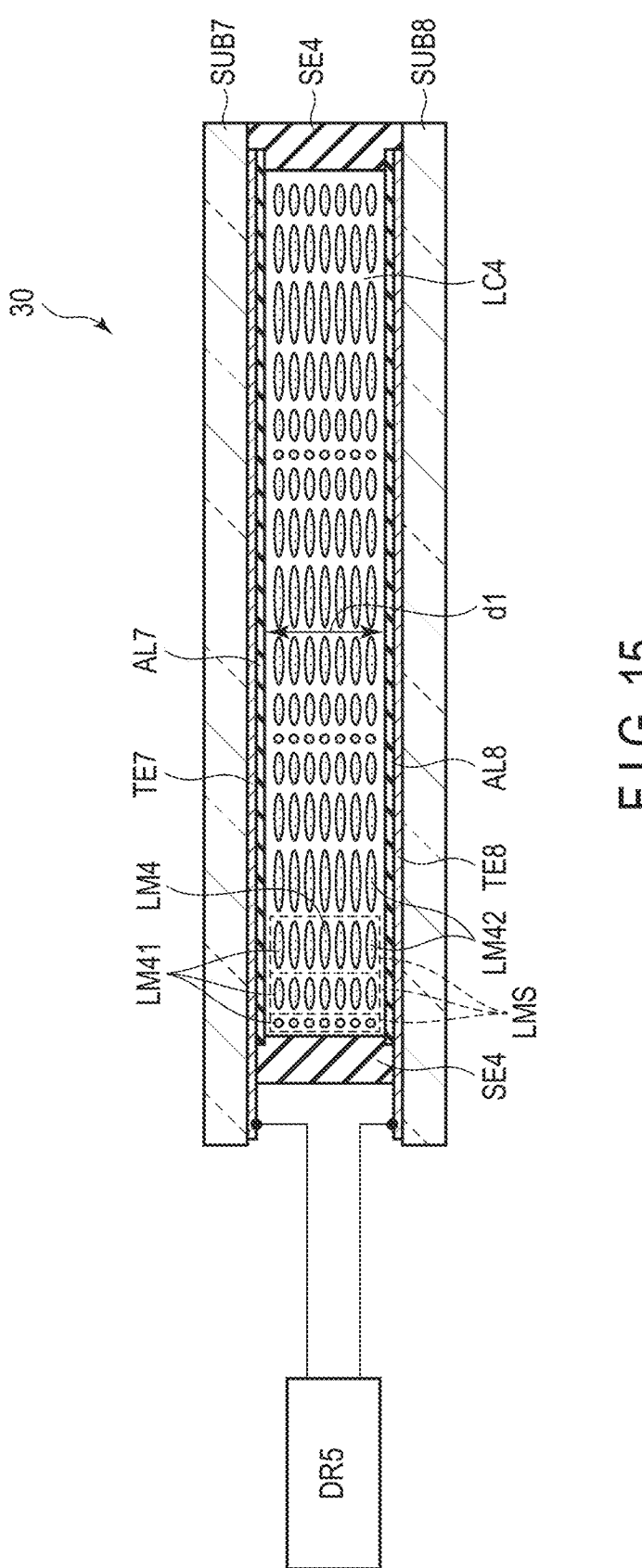
F I G. 15

| | Mode1 | Mode2 |
|---|---|---|
| 3 | ON (Turn-on) | OFF (Turn-off) |
| 2 | ON (Display) | OFF (Transmission) |
| 10 | ON (Non-conversion) | OFF (Conversion) |
| 30 | OFF (Lens) | ON (Non-lens) |

F I G. 18

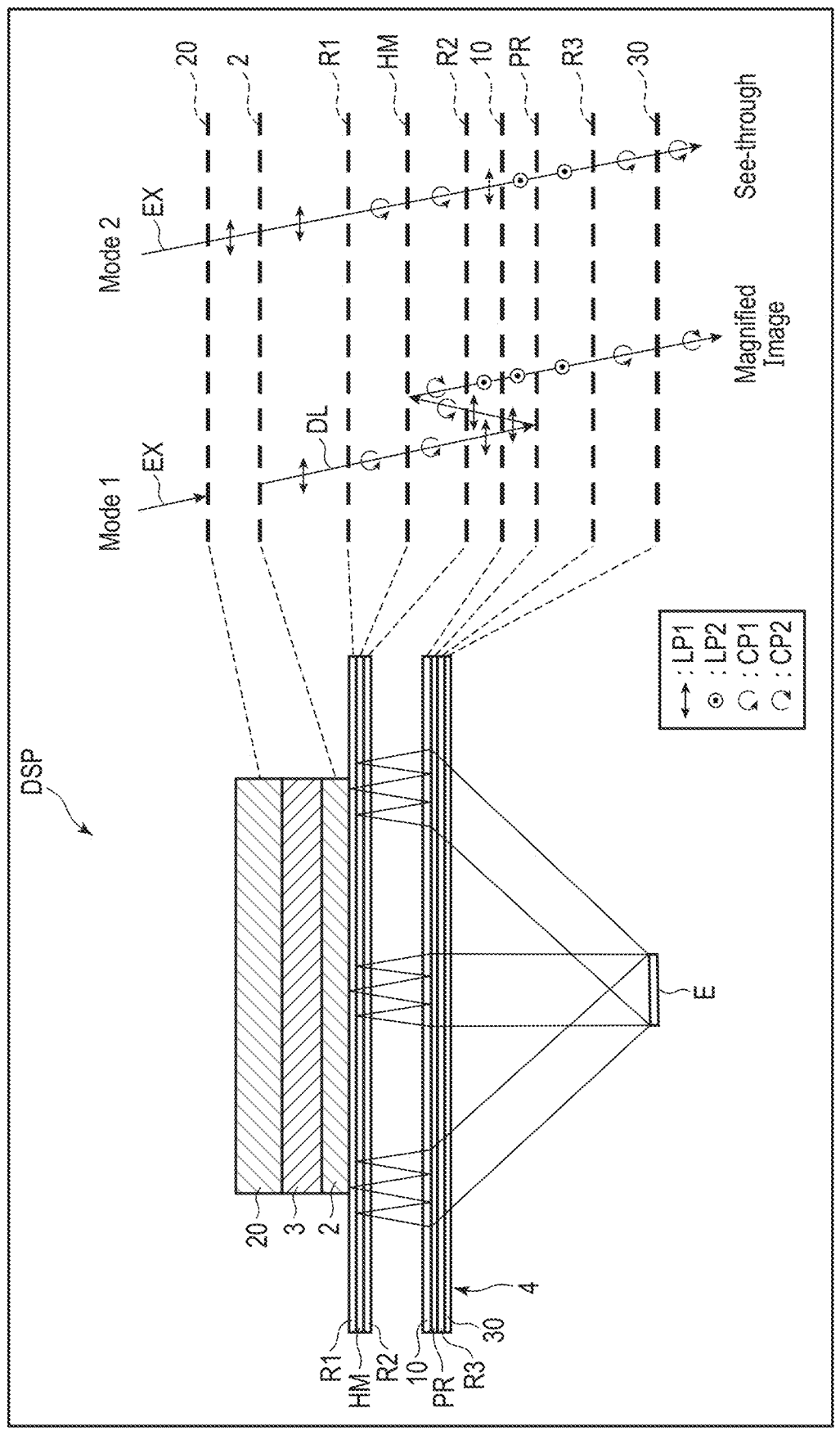
F I G. 20

| | Mode1 | Mode2 |
|---|---|---|
| 20 | ON (Non-transmission) | OFF (Transmission) |
| 3 | ON (Turn-on) | OFF (Turn-off) |
| 2 | ON (Display) | OFF (Transmission) |
| 10 | ON (Non-conversion) | OFF (Conversion) |
| 30 | OFF (Lens) | ON (Non-lens) |

FIG. 21

DISPLAY DEVICE

CROSS-REFERENCE TO RELATED APPLICATIONS

This application is based upon and claims the benefit of priority from Japanese Patent Application No. 2022-140771, filed Sep. 5, 2022, the entire contents of which are incorporated herein by reference.

FIELD

Embodiments described herein relate generally to a display device.

BACKGROUND

In recent years, a technique for providing, for example, virtual reality (VR), using a head-mounted display worn on a user's head has attracted attention. The head-mounted display is configured to display an image on a display provided in front of the user's eyes. This allows the user wearing the head-mounted display to experience a virtual reality space with a sense of reality.

BRIEF DESCRIPTION OF THE DRAWINGS

FIG. 6 is a diagram for describing a field sequential system.

FIG. 7 is a cross-sectional view illustrating a configuration example of a polarization conversion element 10 illustrated in FIG. 3.

FIG. 8 is a diagram for describing an optical action of the display device DSP.

FIG. 9 is a diagram illustrating modes of the display panel 2, the illumination device 3, and the polarization conversion element 10 in a first mode and a second mode.

FIG. 10 is a cross-sectional view illustrating Configuration Example 2 of a display device DSP.

FIG. 11 is a cross-sectional view illustrating a configuration example of a shutter element 20 illustrated in FIG. 10.

FIG. 13 is a diagram illustrating modes of the display panel 2, the illumination device 3, the polarization conversion element 10, and the shutter element 20 in the first mode and the second mode.

FIG. 14 is a cross-sectional view illustrating Configuration Example 3 of a display device DSP.

FIG. 15 is a cross-sectional view illustrating an example of a lens element 30 illustrated in FIG. 14.

FIG. 18 is a diagram illustrating modes of the display panel 2, the illumination device 3, the polarization conversion element 10, and the lens element 30 in the first mode and the second mode.

FIG. 20 is a diagram for describing the optical action of the display device DSP.

FIG. 21 is a diagram illustrating modes of the display panel 2, the illumination device 3, the polarization conversion element 10, the shutter element 20, and the lens element 30 in the first mode and the second mode.

DETAILED DESCRIPTION

Figure 1:
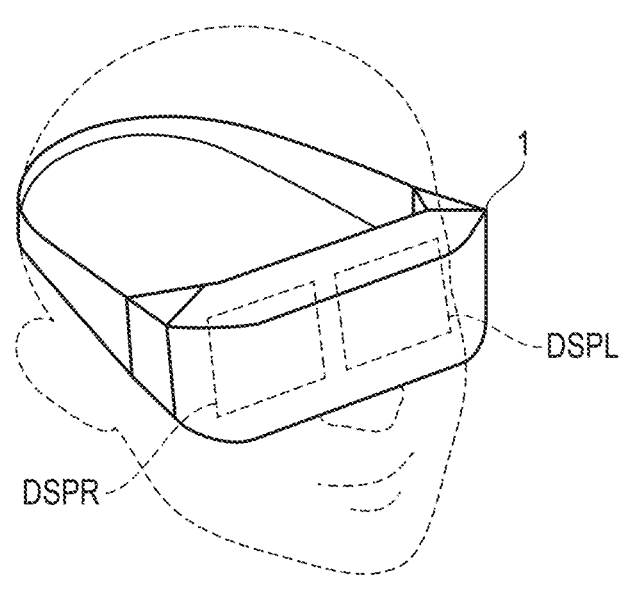
FIG. 1 is a perspective view illustrating an example of the appearance of a head-mounted display 1 to which a display device of an embodiment is applied.

An object of an embodiment is to provide a display device that enables enlarged display and see-through.

In general, according to one embodiment, a display device comprises an illumination device comprising a light guide, and a light emitting element opposed to a side surface of the light guide, a display panel opposed to a first main surface of the light guide and configured to emit display light of linearly polarized light, a first retardation film opposed to the display panel, a holographic optical element opposed to the first retardation film, a second retardation film opposed to the holographic optical element, a reflection polarizer spaced apart from the holographic optical element, and configured to transmit first linearly polarized light and reflect second linearly polarized light orthogonal to the first linearly polarized light, and a polarization conversion element located between the second retardation film and the reflection polarizer, and configured to maintain a polarization direction of the display light and rotate a polarization direction of external light transmitted through the light guide.

According to another embodiment, a display device comprises, an illumination device including a light guide, and a light emitting element opposed to a side surface of the light guide, a display panel opposed to a first main surface of the light guide and configured to emit display light of linearly polarized light, a first retardation film opposed to the display panel, a half mirror opposed to the first retardation film, a second retardation film opposed to the half mirror, a reflection polarizer spaced apart from the half mirror, and configured to transmit first linearly polarized light and reflect second linearly polarized light orthogonal to the first linearly polarized light, a polarization conversion element located between the second retardation film and the reflection polarizer, and configured to maintain a polarization direction of the display light and rotate a polarization direction of external light transmitted through the light guide, a third retardation film opposed to the reflection polarizer, and a lens element opposed to the third retardation film, configured to condense first circularly polarized light which is the display light transmitted through the third retardation film, and configured to transmit the first circularly polarized light which is the external light transmitted through the third retardation film without condensing the first circularly polarized light.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Note that, in order to make the descriptions more easily understandable, some of the drawings illustrate an X axis, a Y axis and a Z axis orthogonal to each other. A direction along the X axis is referred to as a first direction X, a direction along the Y axis is referred to as a second direction Y and a direction along the Z axis is referred to as a third direction Z. A plane defined by the X axis and the Y axis is referred to as an X-Y plane, and viewing toward the X-Y plane is referred to as plan view.

FIG. 1 is a perspective view illustrating an example of an external appearance of a head-mounted display 1 to which a display device according to the present embodiment is applied.

The head-mounted display 1 comprises, for example, a display device DSPR for a right eye and a display device DSPL for a left eye. The display device DSPR and the display device DSPL are disposed such that the display device DSPR is located in front of the user's right eye and the display device DSPL is located in front of the user's left eye when the user is wearing the head-mounted display 1 on the head.

Figure 2:
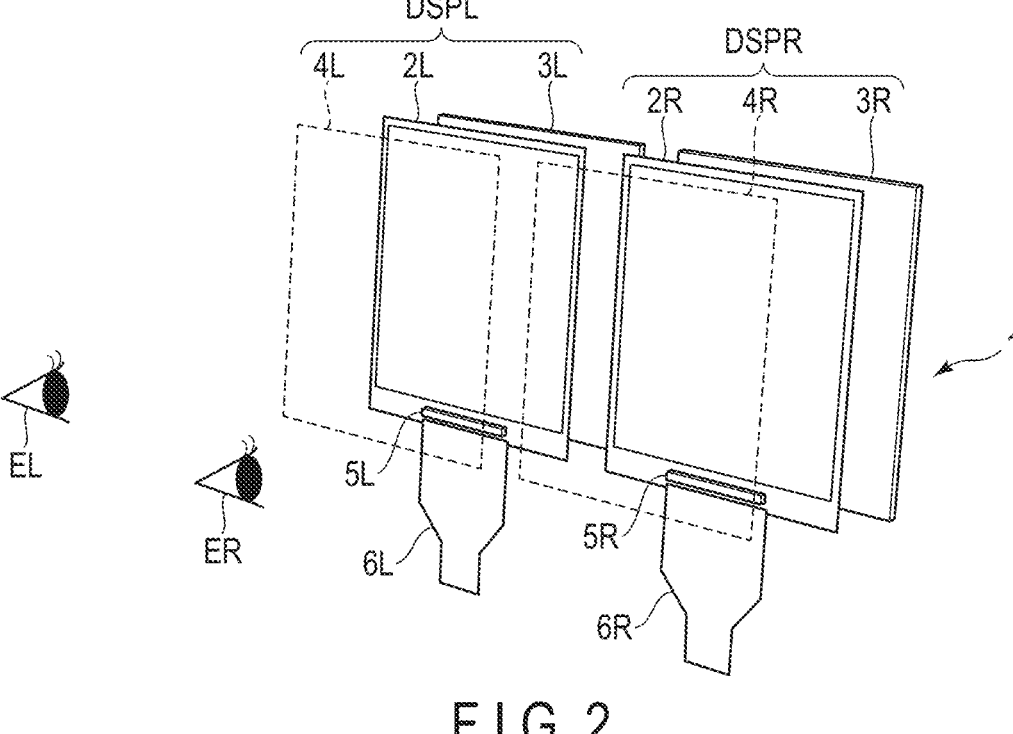
FIG. 2 is a diagram for explaining a summary of the configuration of the head-mounted display 1 shown in FIG. 1.

FIG. 2 is a diagram for explaining a summary of the configuration of the head-mounted display 1 shown in FIG. 1.

The display device DSPR comprises a display panel 2R, an illumination device 3R, and an optical system 4R represented by a broken line. The illumination device 3R is disposed on the back surface of the display panel 2R and is configured to illuminate the display panel 2R. The optical system 4R is disposed on the front surface of the display panel 2R (or between the user's right eye ER and the display panel 2R) and is configured to guide display light from the display panel 2R to the right eye ER.

The display panel 2R includes, for example, a liquid crystal panel and a polarizer. The display panel 2R is disposed between the illumination device 3R and the optical system 4R. For example, a driver IC chip 5R and a flexible printed circuit board 6R are connected to the display panel 2R. The driver IC chip 5R controls the drive of the display panel 2R (particularly, controls the display operation of the display panel 2R).

The display device DSPL comprises a display panel 2L, an illumination device 3L, and an optical system 4L represented by a broken line. The illumination device 3L is disposed on the back surface of the display panel 2L and is configured to illuminate the display panel 2L. The optical system 4L is disposed on the front surface of the display panel 2L (or between the user's left eye EL and the display panel 2L) and is configured to guide display light from the display panel 2L to the left eye EL.

The display panel 2L includes, for example, a liquid crystal panel and a polarizer. The display panel 2L is disposed between the illumination device 3L and the optical system 4L. For example, a driver IC chip 5L and a flexible printed circuit board 6L are connected to the display panel 2L. The driver IC chip 5L controls the drive of the display panel 2L (particularly, controls the display operation of display panel 2L).

The display device DSPL is configured substantially in the same way as the display device DSPR.

That is, the display panel 2R, the illumination device 3R, and the optical system 4R, which constitute the display device DSPR, are configured in the same way as the display panel 2L, the illumination device 3L, and the optical system 4L, which constitute the display device DSPL, respectively.

In a display device DSP of the present embodiment, the display panels 2R and 2L are not limited to examples including liquid crystal panels, but may include display panels comprising self-luminous light-emitting elements such as organic electroluminescent (EL) elements, micro-LEDs, or mini-LEDs. If the display panels 2R and 2L are display panels comprising light-emitting elements, the illumination devices 3R and 3L are omitted. The display panels 2R and 2L are configured to emit linearly polarized display light and include polarizers as necessary, which will be described in detail later.

A host computer H provided outside is connected to each of the display panels 2L and 2R. The host computer H outputs image data corresponding to images displayed on the display panels 2L and 2R. The image displayed on the display panel 2L is an image for the left eye (or an image that is visually recognized by the user's left eye EL). In addition, the image displayed on the display panel 2R is an image for the right eye (or an image that is visually recognized by the user's right eye ER).

For example, when the head-mounted display 1 is used for VR, the image for the left eye and the image for the right eye are images similar to each other, which reproduce the parallax of both eyes. When the image for the left eye displayed on the display panel 2L is visually recognized by the user's left eye EL and the image for the right eye displayed on the display panel 2R is visually recognized by the user's right eye ER, the user can grasp a stereoscopic space (three-dimensional space) as a virtual reality space.

Next, some configuration examples of a display device DSP according to the present embodiment will be described. The display device DSP described in each configuration example can be applied to each of the above-described display devices DSPR and DSPL. In addition, a display panel 2 can be applied to each of the above-described display panels 2R and 2L. In addition, an illumination device 3 can be applied to each of the above-described illumination devices 3R and 3L. In addition, an optical system 4 can be applied to each of the above-described optical systems 4R and 4L.

Configuration Example 1

Figure 3:
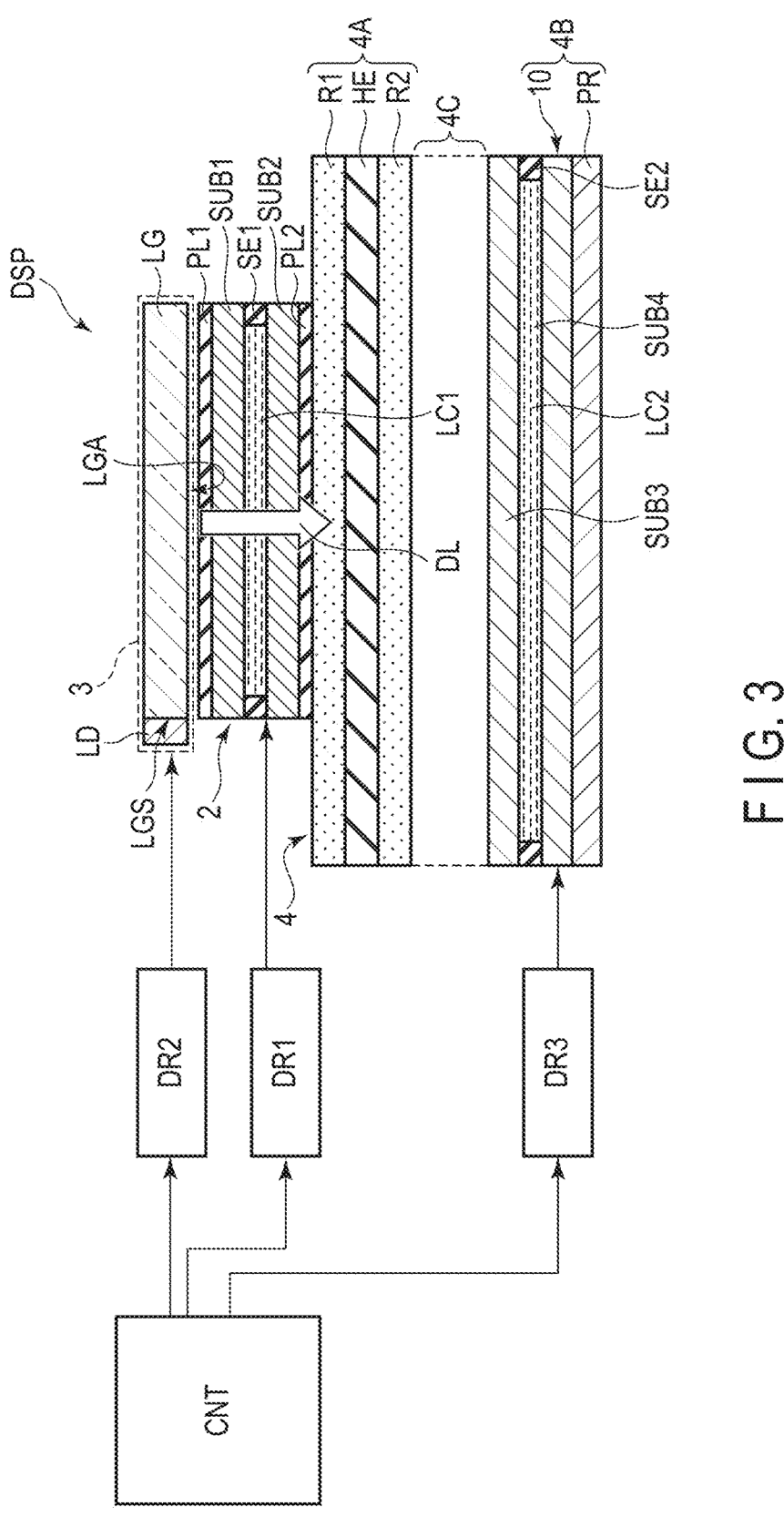
FIG. 3 is a cross-sectional view illustrating Configuration Example 1 of a display device DSP.

FIG. 3 is a cross-sectional view illustrating Configuration Example 1 of a display device DSP.

The display device DSP includes the display panel 2, the illumination device 3, and the optical system 4.

The illumination device 3 includes a light guide LG and a light emitting element LD. The light emitting element LD is disposed to be opposed to a side surface LGS of the light guide LG. A first main surface LGA of the light guide LG is opposed to the display panel 2.

The display panel 2 includes a first substrate SUB1, a second substrate SUB2, a first liquid crystal layer LC1, a first polarizer PL1, and a second polarizer PL2. The first liquid crystal layer LC1 is located between the first substrate SUB1 and the second substrate SUB2, and is sealed by a sealant SE1. The first polarizer PL1 is located between the first substrate SUB1 and the illumination device 3 (or the light guide LG). The second polarizer PL2 is located between the second substrate SUB2 and the optical system 4 (or a first retardation film R1).

Such a display panel 2 is configured to realize so-called normally white in which external light transmitted through the light guide LG is transmitted in a state where an electric field is not formed in the first liquid crystal layer LC1.

Illumination light emitted from the light emitting element LD of the illumination device 3 propagates through the light guide LG to illuminate the display panel 2. In the display panel 2, a part of linearly polarized light of the illumination light is transmitted through the first polarizer PL1, and is selectively modulated in the first liquid crystal layer LC1. A part of the light modulated by the first liquid crystal layer LC1 is transmitted through the second polarizer PL2 and is emitted as display light DL. The display light DL is linearly polarized light parallel to a transmission axis of the second polarizer PL2.

Similarly, the display panel 2 is not limited to the example including the liquid crystal panel in other Configuration Examples as well as Configuration Example 1 described here. When the display panel 2 is a display panel including a light emitting element of a self-luminous type, the illumination device 3 is omitted as described above. In addition, in this case, the display light DL emitted from the light emitting element is transmitted through the second polarizer PL2 and converted into the display light DL of the linearly polarized light.

The optical system 4 includes a first structure 4A and a second structure 4B. The first structure 4A is spaced apart from the second structure 4B. In the example illustrated in FIG. 3, an air layer 4C is interposed between the first structure 4A and the second structure 4B. The first structure 4A is located between the display panel 2 and the second structure 4B (or the air layer 4C). Incidentally, instead of the air layer 4C, a transparent medium may be interposed between the first structure 4A and the second structure 4B.

The first structure 4A includes the first retardation film R1, a holographic optical element HE, and a second retardation film R2. The first retardation film R1 is opposed to the display panel 2 (or the second polarizer PL2). The holographic optical element HE is opposed to the first retardation film R1. The second retardation film R2 is opposed to the holographic optical element HE. The holographic optical element HE is located between the first retardation film R1 and the second retardation film R2.

The first retardation film R1 and the second retardation film R2 are quarter-wave plates, and are configured to impart retardation of ¼ wavelength to transmitted light.

The holographic optical element HE has a pattern of interference fringes and has a refractive index distribution of a period corresponding to a wavelength in a thickness direction. Such a holographic optical element HE is configured to reflect and diffract a part of incident light and has substantially a function equivalent to a concave mirror.

The second structure 4B includes a polarization conversion element 10 and a reflection polarizer PR. The polarization conversion element 10 is located between the second retardation film R2 (or the air layer 4C) and the reflection polarizer PR. The second retardation film R2, the air layer 4C, and the polarization conversion element 10 are interposed between the reflection polarizer PR and the holographic optical element HE.

The polarization conversion element 10 is, for example, a liquid crystal element, and includes a third substrate SUB3, a fourth substrate SUB4, and a second liquid crystal layer LC2. The second liquid crystal layer LC2 is located between the third substrate SUB3 and the fourth substrate SUB4, and is sealed by a sealant SE2. In the illustrated example, the third substrate SUB3 is opposed to the second retardation film R2 via the air layer 4C, and the fourth substrate SUB4 is opposed to the reflection polarizer PR. The second liquid crystal layer LC2 contains twist-aligned liquid crystal molecules, which will be described later.

As will be described in detail later, such a polarization conversion element 10 has a non-conversion mode of maintaining a polarization direction of the linearly polarized light which is the display light DL and a conversion mode of rotating a polarization direction of the linearly polarized light which is the external light transmitted through the light guide LG. For example, the polarization conversion element 10 is a twisted nematic (TN) liquid crystal element, but may be an element different from the TN liquid crystal element as long as the element is configured to be switchable between the non-conversion mode and the conversion mode.

The reflection polarizer PR is configured to transmit first linearly polarized light and reflect second linearly polarized light orthogonal to the first linearly polarized light among the incident light.

Incidentally, the polarization conversion element 10 may be provided in the first structure 4A, and the second retardation film R2 may be provided in the second structure 4B.

A controller CNT is configured to control a first driver DR1, a second driver DR2, and a third driver DR3.

The first driver DR1 drives the display panel 2 to switch between a display mode and a transmission mode. In the display mode, an electric field is selectively formed in the first liquid crystal layer LC1, and an image is displayed. In the transmission mode, an electric field is not formed in first liquid crystal layer LC1, and external light is transmitted through the display panel 2 without displaying an image.

The second driver DR2 drives the illumination device 3 to switch between the turn-on mode synchronized with the display mode and the turn-off mode synchronized with transmission mode.

The third driver DR3 drives the polarization conversion element 10 to switch between the non-conversion mode synchronized with the display mode and the conversion mode synchronized with the transmission mode.

Figure 4:
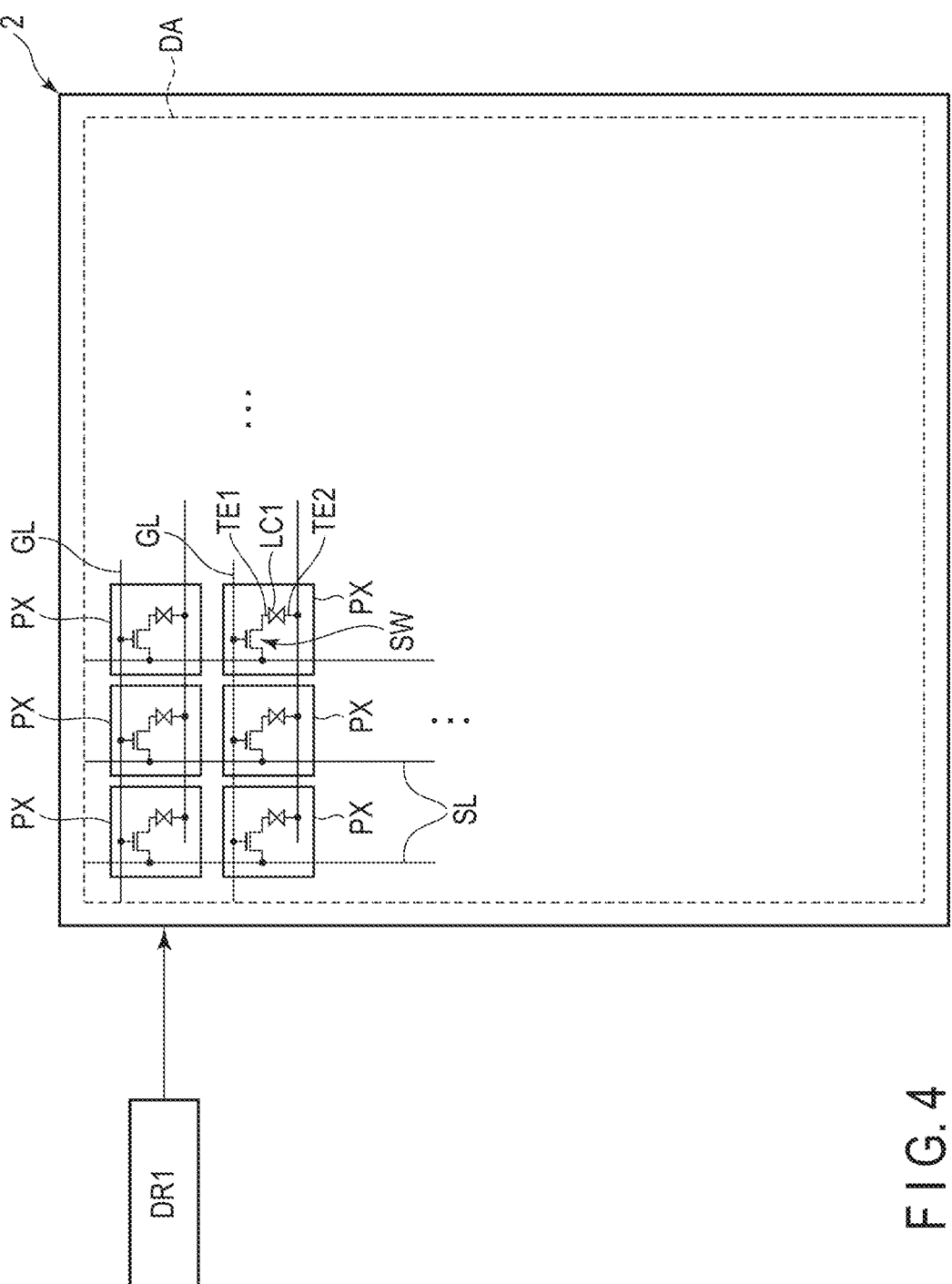
FIG. 4 is a diagram illustrating a configuration example of a display panel 2 shown in FIG. 3.

FIG. 4 is a diagram illustrating a configuration example of the display panel 2 in FIG. 3.

The display panel 2 has a display region DA for displaying an image. The display region DA includes a plurality of pixels PX arrayed in a matrix.

The display panel 2 includes a plurality of scanning lines GL, a plurality of signal lines SL, a switching element SW and a first transparent electrode TE1 disposed in each pixel PX, and a second transparent electrode TE2 disposed over the plurality of pixels PX in the display region DA. The plurality of scanning lines GL and the plurality of signal lines SL intersect each other. The switching element SW is electrically connected to one of the scanning lines GL and one of the signal lines SL. The first transparent electrode TE1 corresponds to a pixel electrode electrically connected to the switching element SW. The second transparent electrode TE2 corresponds to a common electrode opposed to the plurality of first transparent electrodes TE1.

The scanning lines GL, the signal lines SL, the switching element SW, and the first transparent electrode TE1 are provided on the first substrate SUB1 illustrated in FIG. 3. For example, the second transparent electrode TE2 is provided on the first substrate SUB1, but may be provided on the second substrate SUB2. In each pixel PX, an electric field is formed in the first liquid crystal layer LC1 by a potential difference between the first transparent electrode TE1 and the second transparent electrode TE2.

For example, each pixel PX includes a color filter. The color filter may be provided on the first substrate SUB1 or the second substrate SUB2. Incidentally, from a point of view of improving the transmittance of the display device DSP, the color filter may be omitted.

The first driver DR1 includes a gate driver that supplies a scanning signal to the scanning line GL and a display driver that supplies a video signal to the signal line SL.

Figure 5:
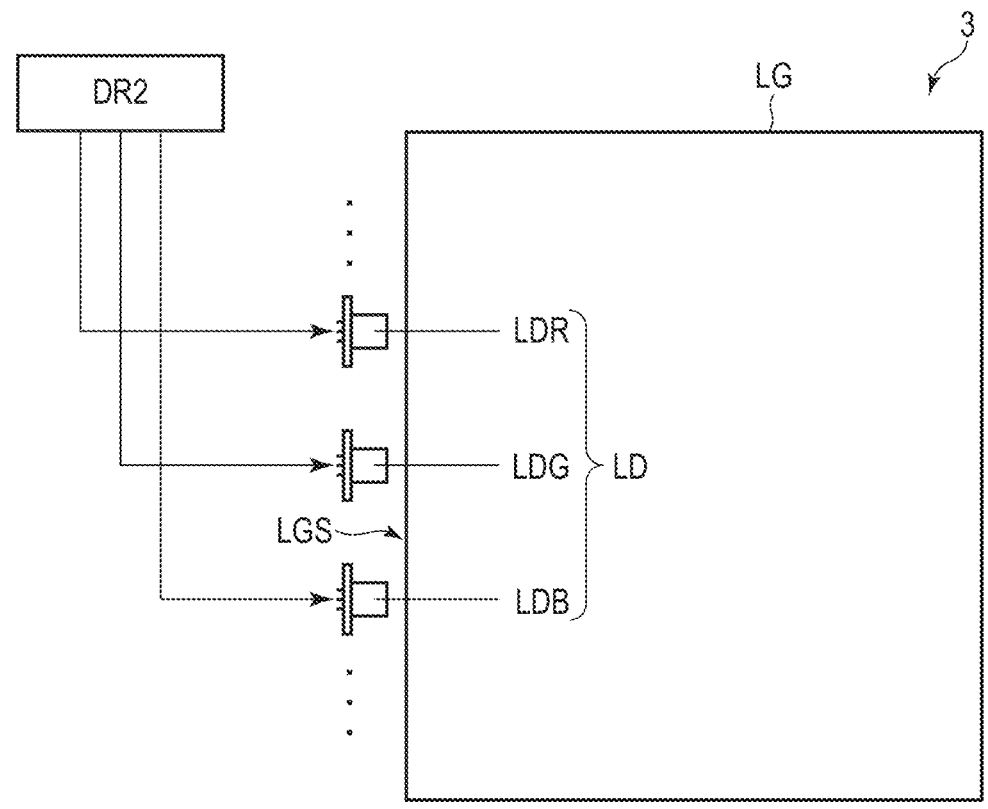
FIG. 5 is a plan view illustrating a configuration example of the illumination device 3 shown in FIG. 3.

FIG. 5 is a plan view illustrating a configuration example of the illumination device 3 illustrated in FIG. 3.

The illumination device 3 includes the light guide LG and a plurality of light emitting elements LD. Each of the plurality of light emitting elements LD is opposed to the side surface LGS of the light guide LG. The plurality of light emitting elements LD include a light emitting element LDB configured to emit light of a blue wavelength (first wavelength), a light emitting element LDG configured to emit light of a green wavelength (second wavelength), and a light emitting element LDR configured to emit light of a red wavelength (third wavelength). The light emitting element LDB, the light emitting element LDG, and the light emitting element LDR are arranged to be spaced apart. These light emitting elements LD are driven by the second driver DR2.

The emitted light from the light emitting element LD desirably has a narrow spectrum width (or color purity is high). For this reason, a laser light source is desirably applied as the light emitting element LD. A center wavelength of a blue laser beam emitted from the light emitting element (first laser device) LDB is defined as $\lambda b$, a center wavelength of a green laser beam emitted from the light emitting element (second laser device) LDG is defined as $\lambda g$, and a center wavelength of a red laser beam emitted from the light emitting element (third laser device) LDR is defined as $\lambda r$. The holographic optical element HE illustrated in FIG. 3 is optimized to reflect light of the central wavelengths $\lambda b$, $\lambda g$, $\lambda r$, respectively.

Here, an example of a method for driving the display panel 2 and the illumination device 3 in a case where each pixel PX of the display panel 2 illustrated in FIG. 4 does not include a color filter will be described.

FIG. 6 is a diagram for describing a field sequential system.

The first driver DR1 drives each pixel PX in a time division manner. The second driver DR2 sequentially drives the light emitting element LDB, the light emitting element LDG, and the light emitting element LDR. The controller CNT controls the first driver DR1 and the second driver DR2 to synchronize a timing at which each light emitting element is turn on with a timing at which the video signal of the color of the turned-on light emitting element is written in the pixel PX.

That is, one frame for displaying an image includes a first subframe for displaying a blue image, a second subframe for displaying a green image, and a third subframe for displaying a red image.

In the first subframe, a video signal corresponding to a blue image is written to the pixel PX, the light emitting element LDB is turned on, and the other light emitting elements LDG and LDR are turned off. Consequently, blue display light DLB is emitted from the display panel 2.

In the second subframe, a video signal corresponding to a green image is written to the pixel PX, the light emitting element LDG is turned on, and the other light emitting elements LDB and LDR are turned off. Consequently, green display light DLG is emitted from the display panel 2.

In the third subframe, a video signal corresponding to a red image is written to the pixel PX, the light emitting element LDR is turned on, and the other light emitting elements LDG and LDB are turned off. Consequently, red display light DLR is emitted from the display panel 2.

Such a field sequential system is applied, and thus, a color image can be displayed on the display panel 2 not including a color filter. Compared with a color filter system in which each pixel PX includes the color filter, in the field sequential system, the transmittance of the display panel 2 can be improved without absorbing undesirable light by the color filter.

In the field sequential system, the light emitting element LDB, the light emitting element LDG, and the light emitting element LDR are sequentially turned on in the turn-on mode of the illumination device 3, and all of the light emitting element LDB, the light emitting element LDG, and the light emitting element LDR are turned off in the turn-off mode of the illumination device 3.

In the color filter system, all of the light emitting element LDB, the light emitting element LDG, and the light emitting element LDR are turned on in the turn-on mode of the illumination device 3, and all of the light emitting element LDB, the light emitting element LDG, and the light emitting element LDR are turned off in the turn-off mode of the illumination device 3.

FIG. 7 is a cross-sectional view illustrating a configuration example of the polarization conversion element 10 illustrated in FIG. 3.

The polarization conversion element 10 includes the third substrate SUB3, the fourth substrate SUB4, and the second liquid crystal layer LC2.

The third substrate SUB3 includes a third transparent electrode TE3 and an alignment film AL3 covering the third transparent electrode TE3. The fourth substrate SUB4 includes a fourth transparent electrode TE4 and an alignment film AL4 covering the fourth transparent electrode TE4.

Each of the third transparent electrode TE3 and the fourth transparent electrode TE4 is, for example, a single plate electrode opposed to each other over the entire region of the second liquid crystal layer LC2. The third transparent electrode TE3 and the fourth transparent electrode TE4 are electrically connected to the third driver DR3 outside the sealant SE2.

Each of the alignment film AL3 and the alignment film AL4 is a horizontal alignment film. An alignment treatment orientation of the alignment film AL3 is orthogonal to an alignment treatment orientation of the alignment film AL4.

Liquid crystal molecules LM2 contained in the second liquid crystal layer LC2 are twist-aligned by 90 degrees by an alignment restriction force of each of the alignment film AL3 and the alignment film AL4 in a state where an electric field is not formed in the second liquid crystal layer LC2. The second liquid crystal layer LC2 in such an initial aligned state exhibits optical rotatory power. In other words, a polarization direction of linearly polarized light transmitted through the second liquid crystal layer LC2 in the initial aligned state is rotated by 90 degrees. Consequently, the conversion mode is realized.

In a case where an electric field is formed in the second liquid crystal layer LC2 due to a potential difference between the third transparent electrode TE3 and the fourth transparent electrode TE4, the liquid crystal molecules LM2 are aligned along normal lines of the third substrate SUB3 and the fourth substrate SUB4. The polarization direction of the linearly polarized light transmitted through the second liquid crystal layer LC2 in the aligned state is maintained. Consequently, the non-conversion mode is realized.

FIG. 8 is a diagram for describing an optical action of the display device DSP.

A first mode for enlargedly displaying the display light DL is indicated as Mode 1 in the drawing, and a second mode for enabling see-through of the display device DSP is indicated as Mode 2 in the drawing. In the second mode, external light EX is hardly enlarged.

FIG. 9 is a diagram illustrating modes of the display panel 2, the illumination device 3, and the polarization conversion element 10 in the first mode and the second mode.

First, the first mode will be described.

In the first mode, the illumination device 3 is set to the turn-on mode, the display panel 2 is set to the display mode, and the polarization conversion element 10 is set to the non-conversion mode.

The display panel 2 emits display light DL of first linearly polarized light LP1. Here, the first linearly polarized light LP1 is, for example, linearly polarized light that oscillates in a direction parallel to a paper surface. When the display light DL is transmitted through the first retardation film R1, a phase difference of ¼ wavelength is imparted to the display light DL. Consequently, when the display light DL is transmitted through the first retardation film R1, the display light DL is converted into first circularly polarized light CP1. Here, the first circularly polarized light CP1 is, for example, counterclockwise circularly polarized light.

Of the first circularly polarized light CP1 transmitted through the first retardation film R1, a part of the first circularly polarized light CP1 is transmitted through the holographic optical element HE and is then transmitted through the second retardation film R2. When the first circularly polarized light CP1 is transmitted through the second retardation film R2, a phase difference of ¼ wavelength is imparted to the first circularly polarized light CP1, and the first circularly polarized light CP1 is converted into the first linearly polarized light LP1.

The first linearly polarized light LP1 transmitted through the second retardation film R2 is transmitted through the polarization conversion element 10 and is reflected by the reflection polarizer PR. Since the polarization conversion element 10 is set to the non-conversion mode, a polarization direction of the first linearly polarized light LP1 transmitted through the polarization conversion element 10 is maintained.

The first linearly polarized light LP1 reflected by the reflection polarizer PR is transmitted through the polarization conversion element 10, is transmitted through the second retardation film R2, and is converted into the first circularly polarized light CP1. Of the first circularly polarized light CP1 transmitted through the second retardation film R2, a part of the first circularly polarized light CP1 is reflected by the holographic optical element HE. When the first circularly polarized light CP1 is reflected by the holographic optical element HE, the first circularly polarized light CP1 is converted into second circularly polarized light CP2. Here, the second circularly polarized light CP2 is, for example, clockwise circularly polarized light.

The second circularly polarized light CP2 reflected by the holographic optical element HE is transmitted through the second retardation film R2 and is converted into second linearly polarized light LP2. Here, the second linearly polarized light is linearly polarized light that oscillates in a direction orthogonal to the first linearly polarized light LP1, in other words, in a direction perpendicular to the drawing.

The second linearly polarized light LP2 transmitted through the second retardation film R2 is transmitted through the polarization conversion element 10 set to the non-conversion mode, and is transmitted through the reflection polarizer PR. Transmitted light of the reflection polarizer PR is reflected light from the holographic optical element HE, and is condensed on a pupil E of a user by an effect of the concave mirror.

According to such a display device DSP, the optical system 4 has an optical path passing three times between the holographic optical element HE and the reflection polarizer PR. In other words, in the optical system 4, an optical distance between the holographic optical element HE and the reflection polarizer PR is about three times an actual interval between the holographic optical element HE and the reflection polarizer PR. Since the holographic optical element HE acts on as the concave mirror, the reflected light at the holographic optical element HE is condensed on the pupil E of the user. Consequently, the user can observe an enlarged image.

Next, the second mode will be described.

In the second mode, the illumination device 3 is set to the turn-off mode, the display panel 2 is set to the transmission mode, and the polarization conversion element 10 is set to the conversion mode.

A part of the external light EX transmitted through the illumination device 3 (light guide LG) is transmitted through the second polarizer PL2 of the display panel 2 set to the transmission mode. The external light EX transmitted through the display panel 2 is the first linearly polarized light LP1. The external light EX is transmitted through the first retardation film R1 and is converted into the first circularly polarized light CP1.

Of the first circularly polarized light CP1 transmitted through the first retardation film R1, a part of the first circularly polarized light CP1 is transmitted through the holographic optical element HE and is then transmitted through the second retardation film R2. The first circularly polarized light CP1 is transmitted through the second retardation film R2 and is converted into the first linearly polarized light LP1.

When the first linearly polarized light LP1 transmitted through the second retardation film R2 is transmitted through the polarization conversion element 10 set to the conversion mode, the polarization direction is rotated to be converted into the second linearly polarized light LP2. The second linearly polarized light LP2 transmitted through the polarization conversion element 10 is transmitted through the reflection polarizer PR.

In other words, the external light EX reaches the pupil E of the user with almost no lens action in the optical system 4. The above case means that the see-through of the display device DSP is enabled.

As described above, according to Configuration Example 1, it is possible to provide the display device DSP that enables the enlarged display of the image displayed on the display panel 2 in the first mode and enables the see-through in the second mode.

Incidentally, the first linearly polarized light LP1 described with reference to FIG. 8 may be replaced with the second linearly polarized light LP2, or the first circularly polarized light CP1 may be replaced with the second circularly polarized light CP2.

Next, another Configuration Example will be described. Incidentally, in the following description, components identical to the components in Configuration Example 1 are denoted by identical reference signs, and the description thereof may be omitted.

Configuration Example 2

FIG. 10 is a cross-sectional view illustrating Configuration Example 2 of a display device DSP.

Configuration Example 2 illustrated in FIG. 10 is different from Configuration Example 1 illustrated in FIG. 3 in that the shutter element 20 opposed to the light guide LG is added.

The display panel 2, the illumination device 3, and the optical system 4 including the polarization conversion element 10 has the configuration described in Configuration Example 1.

The shutter element 20 is opposed to a second main surface LGB opposite to the first main surface LGA of the light guide LG. In other words, the light guide LG is located between the display panel 2 and the shutter element 20.

The shutter element 20 is, for example, a liquid crystal element, and includes a fifth substrate SUB5, a sixth substrate SUB6, a third liquid crystal layer LC3, a third polarizer PL3, and a fourth polarizer PL4. The third liquid crystal layer LC3 is located between the fifth substrate SUB5 and the sixth substrate SUB6, and is sealed by a sealant SE3. The third liquid crystal layer LC3 contains twist-aligned liquid crystal molecules, which will be described later. The third polarizer PL3 is opposed to the fifth substrate SUB5. The fourth polarizer PL4 is located between the sixth substrate SUB6 and the illumination device 3 (or the light guide LG).

As will be described in detail later, such a shutter element 20 has a transmission mode for transmitting external light and a non-transmission mode for shielding external light. For example, the shutter element 20 is a twisted nematic (TN) liquid crystal element, but may be an element different from the TN liquid crystal element as long as the element is configured to be switchable between the transmission mode and the non-transmission mode.

A transmission axis T3 of the third polarizer PL3 and a transmission axis T4 of the fourth polarizer PL4 are orthogonal to each other. A transmission axis T1 of the first polarizer PL1 and a transmission axis T4 of the fourth polarizer PL4 are parallel to each other. Incidentally, the display panel 2 is configured to realize normally white as described in Configuration Example 1, and the transmission axis T1 of the first polarizer PL1 and the transmission axis T2 of the second polarizer PL2 are, for example, parallel to each other.

The controller CNT is configured to control the first driver DR1, the second driver DR2, the third driver DR3, and the fourth driver DR4.

The first driver DR1 drives the display panel 2 to switch between a display mode and a transmission mode.

The second driver DR2 drives the illumination device 3 to switch between the turn-on mode synchronized with the display mode and the turn-off mode synchronized with the transmission mode.

The third driver DR3 drives the polarization conversion element 10 to switch between the non-conversion mode synchronized with the display mode and the conversion mode synchronized with the transmission mode.

The fourth driver DR4 drives the shutter element 20 to switch between the non-transmission mode synchronized with the display mode of the display panel 2 and the transmission mode synchronized with the transmission mode of the display panel 2.

FIG. 11 is a cross-sectional view illustrating a configuration example of the shutter element 20 illustrated in FIG. 10.

The shutter element 20 includes the fifth substrate SUB5, the sixth substrate SUB6, the third liquid crystal layer LC3, the third polarizer PL3, and the fourth polarizer PL4.

The fifth substrate SUB5 includes a fifth transparent electrode TE5 and an alignment film AL5 covering the fifth transparent electrode TE5. The sixth substrate SUB6 includes a sixth transparent electrode TE6 and an alignment film AL6 covering the sixth transparent electrode TE6.

Each of the fifth transparent electrode TE5 and the sixth transparent electrode TE6 is, for example, a single plate electrode opposed to each other over the entire region of the third liquid crystal layer LC3. The fifth transparent electrode TE5 and the sixth transparent electrode TE6 are electrically connected to the fourth driver DR4 outside the sealant SE3.

Each of the alignment film AL5 and the alignment film AL6 is a horizontal alignment film. An alignment treatment orientation of the alignment film AL5 is orthogonal to an alignment treatment orientation of the alignment film AL6.

Liquid crystal molecules LM3 contained in the third liquid crystal layer LC3 are twist-aligned by 90 degrees by an alignment restriction force of each of alignment film AL5 and alignment film AL6 in a state where an electric field is not formed in the third liquid crystal layer LC3. The third liquid crystal layer LC3 in the initial aligned state exhibits optical rotatory power. In other words, a polarization direction of linearly polarized light transmitted through the third liquid crystal layer LC3 in the initial aligned state is rotated by 90 degrees.

Incident light of the shutter element 20 is linearly polarized light parallel to the transmission axis T3 of the third polarizer PL3. The linearly polarized light is transmitted through the third liquid crystal layer LC3 in the initial aligned state, and a polarization direction thereof is rotated by 90 degrees. The linearly polarized light transmitted through the third liquid crystal layer LC3 is parallel to the transmission axis T4 of the fourth polarizer PL4, and is transmitted through the fourth polarizer PL4. Consequently, the transmission mode of the shutter element 20 is realized.

In a case where an electric field is formed in the third liquid crystal layer LC3 due to a potential difference between the fifth transparent electrode TE5 and the sixth transparent electrode TE6, the liquid crystal molecules LM3 are aligned along normal lines of the fifth substrate SUB5 and the sixth substrate SUB6. The polarization direction of the linearly polarized light transmitted through the third liquid crystal layer LC3 in the aligned state is maintained.

The linearly polarized light transmitted through the third polarizer PL3 is transmitted through the third liquid crystal layer LC3 in which the electric field is formed, and the polarization direction is maintained. Since the linearly polarized light transmitted through the third liquid crystal layer LC3 is orthogonal to the transmission axis T4 of the fourth polarizer PL4, the linearly polarized light is absorbed by the fourth polarizer PL4. Consequently, the non-transmission mode of the shutter element 20 is realized.

Figure 12:
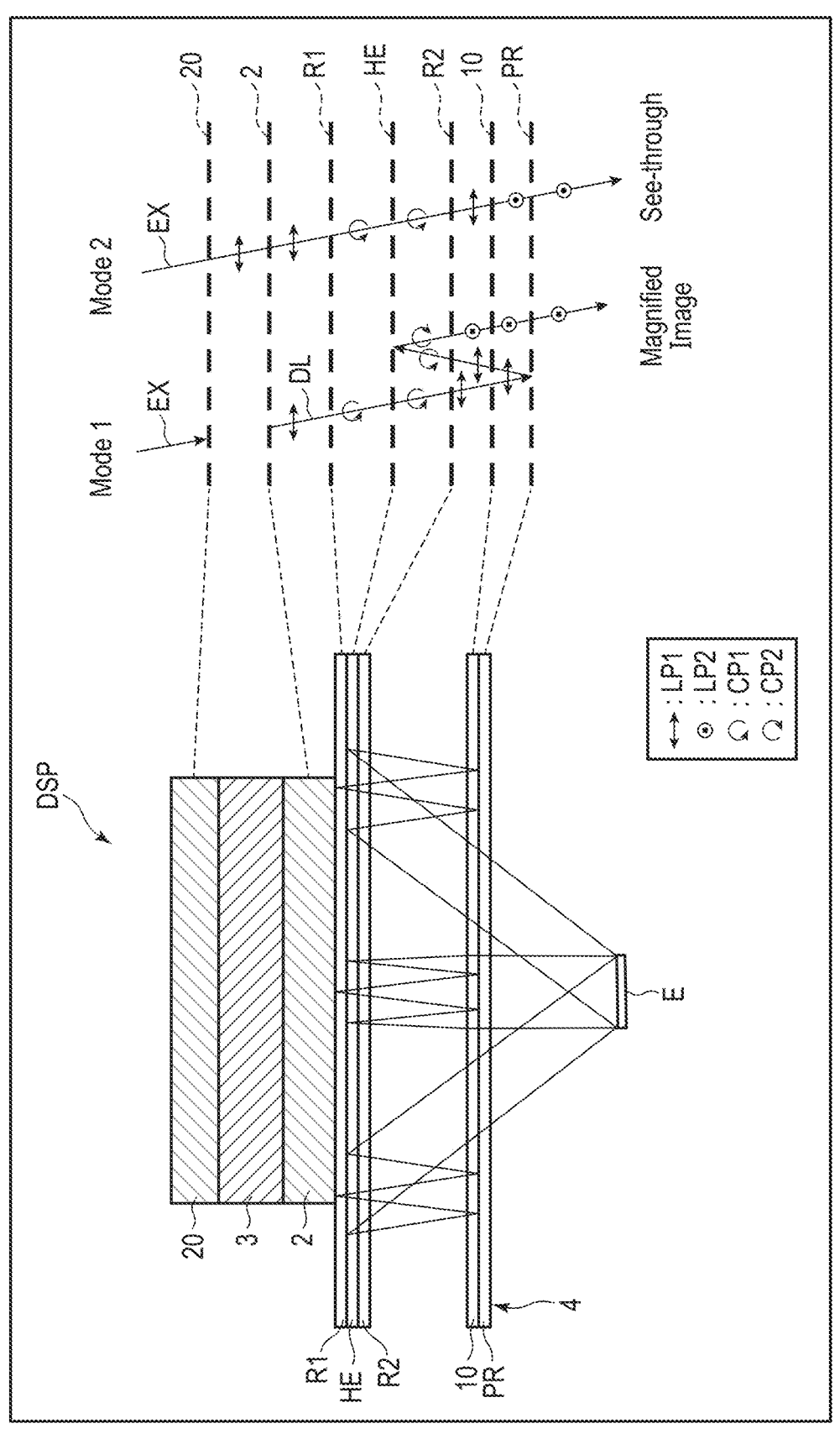
FIG. 12 is a diagram for describing the optical action of the display device DSP.

FIG. 12 is a diagram for describing an optical action of the display device DSP.

A first mode for enlargedly displaying the display light DL is indicated as Mode 1 in the drawing, and a second mode for enabling see-through of the display device DSP is indicated as Mode 2 in the drawing. In the second mode, external light EX is hardly enlarged.

FIG. 13 is a diagram illustrating modes of the display panel 2, the illumination device 3, the polarization conversion element 10, and the shutter element 20 in the first mode and the second mode.

First, the first mode will be described.

In the first mode, the shutter element 20 is set to the non-transmission mode, the illumination device 3 is set to the turn-on mode, the display panel 2 is set to the display mode, and the polarization conversion element 10 is set to the non-conversion mode.

Since the shutter element 20 is set to the non-transmission mode, the external light EX is shielded by the shutter element 20.

The display panel 2 emits display light DL of first linearly polarized light LP1. When the display light DL is transmitted through the first retardation film R1, the display light DL is converted into the first circularly polarized light CP1.

Of the first circularly polarized light CP1 transmitted through the first retardation film R1, a part of the first circularly polarized light CP1 is transmitted through the holographic optical element HE, is transmitted through the second retardation film R2, and is converted into the first linearly polarized light LP1.

The first linearly polarized light LP1 transmitted through the second retardation film R2 is transmitted through the polarization conversion element 10 and is reflected by the reflection polarizer PR. Since the polarization conversion element 10 is set to the non-conversion mode, a polarization direction of the first linearly polarized light LP1 transmitted through the polarization conversion element 10 is maintained.

The first linearly polarized light LP1 reflected by the reflection polarizer PR is transmitted through the polarization conversion element 10, is transmitted through the second retardation film R2, and is converted into the first circularly polarized light CP1. Of the first circularly polarized light CP1 transmitted through the second retardation film R2, a part of the first circularly polarized light CP1 is reflected by the holographic optical element HE. When the first circularly polarized light CP1 is reflected by the holographic optical element HE, the first circularly polarized light CP1 is converted into second circularly polarized light CP2.

The second circularly polarized light CP2 reflected by the holographic optical element HE is transmitted through the second retardation film R2 and is converted into second linearly polarized light LP2.

The second linearly polarized light LP2 transmitted through the second retardation film R2 is transmitted through the polarization conversion element 10 set to the non-conversion mode, and is transmitted through the reflection polarizer PR. Transmitted light of the reflection polarizer PR is reflected light from the holographic optical element HE, and is condensed on a pupil E of a user by an effect of the concave mirror.

According to such a display device DSP, the user can observe the enlarged image as in Configuration Example 1. At this time, since the external light is shielded by the shutter element 20, a contrast ratio of the enlarged image to be displayed is improved, and display quality can be improved.

Next, the second mode will be described.

In the second mode, the shutter element 20 is set to the transmission mode, the illumination device 3 is set to the turn-off mode, the display panel 2 is set to the transmission mode, and the polarization conversion element 10 is set to the conversion mode.

Since the shutter element 20 is set to the transmission mode, a part of the external light EX is transmitted through the shutter element 20 and is further transmitted through the illumination device 3 (light guide LG). The external light EX transmitted through the shutter element 20 is the first linearly polarized light LP1 parallel to the transmission axis T4 of the fourth polarizer PL4. The first linearly polarized light LP1 transmitted through the shutter element 20 and the illumination device 3 is parallel to the transmission axis T1 of the first polarizer PL1 of the display panel 2. For this reason, the first linearly polarized light LP1 incident on the display panel 2 is hardly absorbed by the first polarizer PL1.

Since the display panel 2 is set to the transmission mode, the first linearly polarized light LP1 is transmitted through the second polarizer PL2 of the display panel 2. The first linearly polarized light LP1 transmitted through the display panel 2 is transmitted through the first retardation film R1 and is converted into the first circularly polarized light CP1.

A part of the first circularly polarized light CP1 transmitted through the first retardation film R1 is transmitted through the holographic optical element HE, is transmitted through the second retardation film R2, and is converted into the first linearly polarized light LP1.

When the first linearly polarized light LP1 transmitted through the second retardation film R2 is transmitted through the polarization conversion element 10 set to the conversion mode, the polarization direction is rotated to be converted into the second linearly polarized light LP2. The second linearly polarized light LP2 transmitted through the polarization conversion element 10 is transmitted through the reflection polarizer PR. In other words, the external light EX reaches the pupil E of the user with almost no lens action in the optical system 4.

In Configuration Example 2, as in Configuration Example 1, it is also possible to provide the display device DSP that enables the enlarged display of the image displayed on the display panel 2 in the first mode and enables the see-through in the second mode.

In addition, in the first mode, visibility of the enlargedly displayed image can be improved. In addition, in the second mode, it is possible to suppress undesirable absorption of the external light in the display panel 2 of the linearly polarized light transmitted through the shutter element 20.

Incidentally, the light guide LG is desirably made of a transparent medium having substantially zero refractive anisotropy. The medium having substantially zero refractive anisotropy corresponds to a medium having substantially zero aligned birefringence due to stretching alignment and substantially zero photo-elastic birefringence due to stress deformation. For example, the light guide LG is made of a polymer. Furthermore, the light guide LG is formed as a copolymer obtained by polymerization of a plurality of monomers. Incidentally, the light guide LG may be made of glass, but is desirably made of a polymer in consideration of the point of view of weight reduction, processability, and the like.

The light guide LG having substantially zero refractive anisotropy is applied, and thus, a polarization state of the external light EX transmitted through the light guide LG hardly changes. For this reason, when the linearly polarized light transmitted through the shutter element 20 is transmitted through the light guide LG, the polarization direction thereof is maintained, and the linearly polarized light is transmitted through the first polarizer PL1 of the display panel 2. Accordingly, in the second mode, it is possible to suppress the undesirable absorption of the external light EX in the display panel 2.

Incidentally, the first linearly polarized light LP1 described with reference to FIG. 12 may be replaced with the second linearly polarized light LP2, or the first circularly polarized light CP1 may be replaced with the second circularly polarized light CP2.

MODIFIED EXAMPLE

In Configuration Example 2, the first mode and the second mode illustrated in FIG. 13 are alternately performed in a time division manner, it is possible to provide augmented reality (AR). That is, in the first mode, the image (enlarged image) displayed on the display panel 2 is observed, and in the second mode, a real landscape is observed through the display device DSP. The user can observe the enlarged image superposed on the real landscape.

Configuration Example 3

FIG. 14 is a cross-sectional view illustrating Configuration Example 3 of the display device DSP.

Configuration Example 3 illustrating in FIG. 14 is different from Configuration Example 1 illustrating in FIG. 3 in the configuration of the optical system 4.

The display panel 2 and the illumination device 3 have the configuration described in Configuration Example 1.

In the optical system 4, the first structure 4A includes the first retardation film R1, a half mirror HM, and the second retardation film R2. The first retardation film R1 is opposed to the display panel 2 (or the second polarizer PL2). The half mirror HM is opposed to the first retardation film R1. The second retardation film R2 is opposed to the half mirror HM. The half mirror HM is located between the first retardation film R1 and the second retardation film R2.

The first retardation film R1 and the second retardation film R2 are quarter-wave plates, and are configured to impart retardation of ¼ wavelength to transmitted light.

The half mirror HM is configured to transmit about 50% of the incident light and reflect about 50% of the incident light, and has almost no lens action.

The second structure 4B includes the polarization conversion element 10, the reflection polarizer PR, a third retardation film R3, and the lens element 30. The polarization conversion element 10 is located between the second retardation film R2 (or the air layer 4C) and the reflection polarizer PR, and has the configuration described in Configuration Example 1. The second retardation film R2, the air layer 4C, and the polarization conversion element 10 are interposed between the reflection polarizer PR and the half mirror HM. The reflection polarizer PR is opposed to the polarization conversion element 10 and is located between the polarization conversion element 10 and the third retardation film R3. The third retardation film R3 is opposed to the reflection polarizer PR, and is located between reflection polarizer PR and the lens element 30. The lens element 30 is opposed to the third retardation film R3.

The third retardation film R3 is a quarter-wave plate, and is configured to impart retardation of ¼ wavelength to transmitted light. The reflection polarizer PR is configured to transmit first linearly polarized light and reflect second linearly polarized light orthogonal to the first linearly polarized light among the incident light.

The lens element 30 is, for example, a liquid crystal element, and includes a seventh substrate SUB7, an eighth substrate SUB8, and the fourth liquid crystal layer LC4. The fourth liquid crystal layer LC4 is located between the seventh substrate SUB7 and the eighth substrate SUB8, and is sealed by a sealant SE4. In the illustrated example, the seventh substrate SUB7 is opposed to the third retardation film R3. The fourth liquid crystal layer LC4 contains twist-aligned liquid crystal molecules, which will be described later.

As will be described in detail later, such a lens element 30 is configured to have a lens mode for condensing circularly polarized light that is the display light DL and a non-lens mode for transmitting circularly polarized light that is external light transmitted through the light guide LG without being condensed. For example, the lens element 30 is a liquid crystal element including a nematic liquid crystal, but may be an element different from the liquid crystal element as long as the element is configured to be switchable between the lens mode and the non-lens mode.

Incidentally, the polarization conversion element 10 may be provided in the first structure 4A, and the second retardation film R2 may be provided in the second structure 4B.

The controller CNT is configured to control the first driver DR1, the second driver DR2, the third driver DR3, and the fifth driver DR5.

The first driver DR1 drives the display panel 2 to switch between a display mode and a transmission mode.

The second driver DR2 drives the illumination device 3 to switch between the turn-on mode synchronized with the display mode and the turn-off mode synchronized with the transmission mode.

The third driver DR3 drives the polarization conversion element 10 to switch between the non-conversion mode synchronized with the display mode and the conversion mode synchronized with the transmission mode.

The fifth driver DR5 drives the lens element 30 to switch between the lens mode synchronized with the display mode and the non-lens mode synchronized with the transmission mode.

FIG. 15 is a cross-sectional view illustrating an example of the lens element 30 illustrated in FIG. 14.

The lens element 30 includes the seventh substrate SUB7, the eighth substrate SUB8, and the fourth liquid crystal layer LC4.

The seventh substrate SUB7 includes a seventh transparent electrode TE7 and an alignment film AL7 covering the seventh transparent electrode TE7. The eighth substrate SUB8 includes an eighth transparent electrode TE8 and an alignment film AL8 covering the eighth transparent electrode TE8.

Each of the seventh transparent electrode TE7 and the eighth transparent electrode TE8 is, for example, a single plate electrode opposed over the entire region of the fourth liquid crystal layer LC4. The seventh transparent electrode TE7 and the eighth transparent electrode TE8 are electrically connected to the fifth driver DR5 outside the sealant SE4.

Each of the alignment film AL7 and the alignment film AL8 is a horizontal alignment film.

The fourth liquid crystal layer LC4 includes a plurality of liquid crystal structures LMS. When one liquid crystal structure LMS is noted, the liquid crystal structure LMS has liquid crystal molecules LM41 located on one edge side thereof and liquid crystal molecules LM42 located on the other edge side thereof. The liquid crystal molecules LM41 are near to the alignment film AL7, and the liquid crystal molecules LM42 are near to the alignment film AL8. Alignment directions of the liquid crystal molecules LM41 and alignment directions of the liquid crystal molecules LM42 approximately match each other. In addition, alignment directions of another liquid crystal molecules LM4 between the liquid crystal molecules LM41 and the liquid crystal molecules LM42 also approximately match the alignment directions of the liquid crystal molecules LM41. In other words, the plurality of liquid crystal molecules LM4 arranged in a thickness direction constitute one liquid crystal structure LMS, and the alignment directions of the liquid crystal molecules LM4 are identical.

In addition, in the fourth liquid crystal layer LC4, the plurality of adjacent liquid crystal structures LMS are aligned in different directions. The alignment directions of the plurality of liquid crystal molecules LM41 arranged along the alignment film AL7 and the alignment directions of the plurality of liquid crystal molecules LM42 arranged along the alignment film AL8 continuously (or linearly) change.

When a thickness of the fourth liquid crystal layer LC4 is d1 and refractive anisotropy of the fourth liquid crystal layer LC4 (a difference between a refractive index ne of the fourth liquid crystal layer LC4 for extraordinary light and a refractive index no of the fourth liquid crystal layer LC4 for ordinary light) is Δn, a retardation Δn·d1 of the fourth liquid crystal layer LC4 is set to ½ of a specific wavelength λ.

Figure 16:
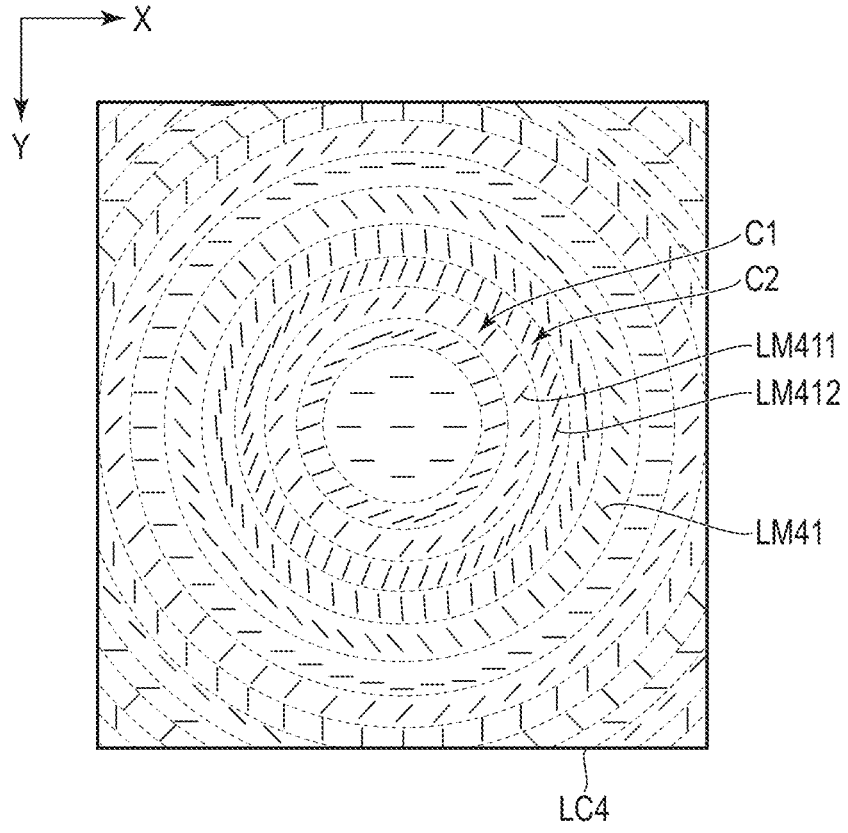
FIG. 16 is a plan view illustrating an example of an alignment pattern in a fourth liquid crystal layer LC4 illustrated in FIG. 15.

FIG. 16 is a plan view illustrating an example of an alignment pattern in the fourth liquid crystal layer LC4 illustrated in FIG. 15.

The alignment pattern illustrated in FIG. 16 corresponds to an example of the initial aligned state in which an electric field is not formed in the fourth liquid crystal layer LC4. Here, the alignment pattern of the liquid crystal molecules LM41 close to the alignment film AL7 among the liquid crystal molecules LM4 contained in the fourth liquid crystal layer LC4 is illustrated.

In concentric circles indicated by dotted lines in the drawing, spatial phases are aligned. Alternatively, in an annular region surrounded by two adjacent concentric circles, the alignment directions of the liquid crystal molecules LM41 are aligned. However, the alignment directions of the liquid crystal molecules LM41 in the adjacent annular regions are different from each other.

For example, the fourth liquid crystal layer LC4 includes a first annular region C1 and a second annular region C2 in plan view. The second annular region C2 is located outside the first annular region C1. The first annular region C1 is constituted by first liquid crystal molecules LM411 aligned in an identical direction. In addition, the second annular region C2 is constituted by second liquid crystal molecules LM412 aligned in an identical direction. Alignment directions of the first liquid crystal molecules LM411 are different from alignment directions of the second liquid crystal molecules LM412.

Similarly, the alignment directions of the liquid crystal molecules LM41 arranged along a radial direction from a center region of the concentric circle are different from each other and continuously changed. In other words, in plan view, the spatial phase of the fourth liquid crystal layer LC4 is different along the radial direction, and continuously changed.

In a case where the first circularly polarized light is incident on the lens element 30 having such a configuration, the first circularly polarized light is condensed toward the center of the concentric circle, and moreover, the transmitted light of the lens element 30 is converted into the second circularly polarized light of a direction opposite to a direction of the first circularly polarized light. Consequently, the lens mode is realized.

In a case where an electric field is formed in the fourth liquid crystal layer LC4 due to a potential difference between the seventh transparent electrode TE7 and the eighth transparent electrode TE8, the liquid crystal molecules LM4 are aligned along normal lines of the seventh substrate SUB7 and the eighth substrate SUB8. The polarization direction of the first circularly polarized light transmitted through the fourth liquid crystal layer LC4 in such an aligned state is maintained, and there is no almost lens action. Consequently, the non-lens mode is realized.

Figure 17:
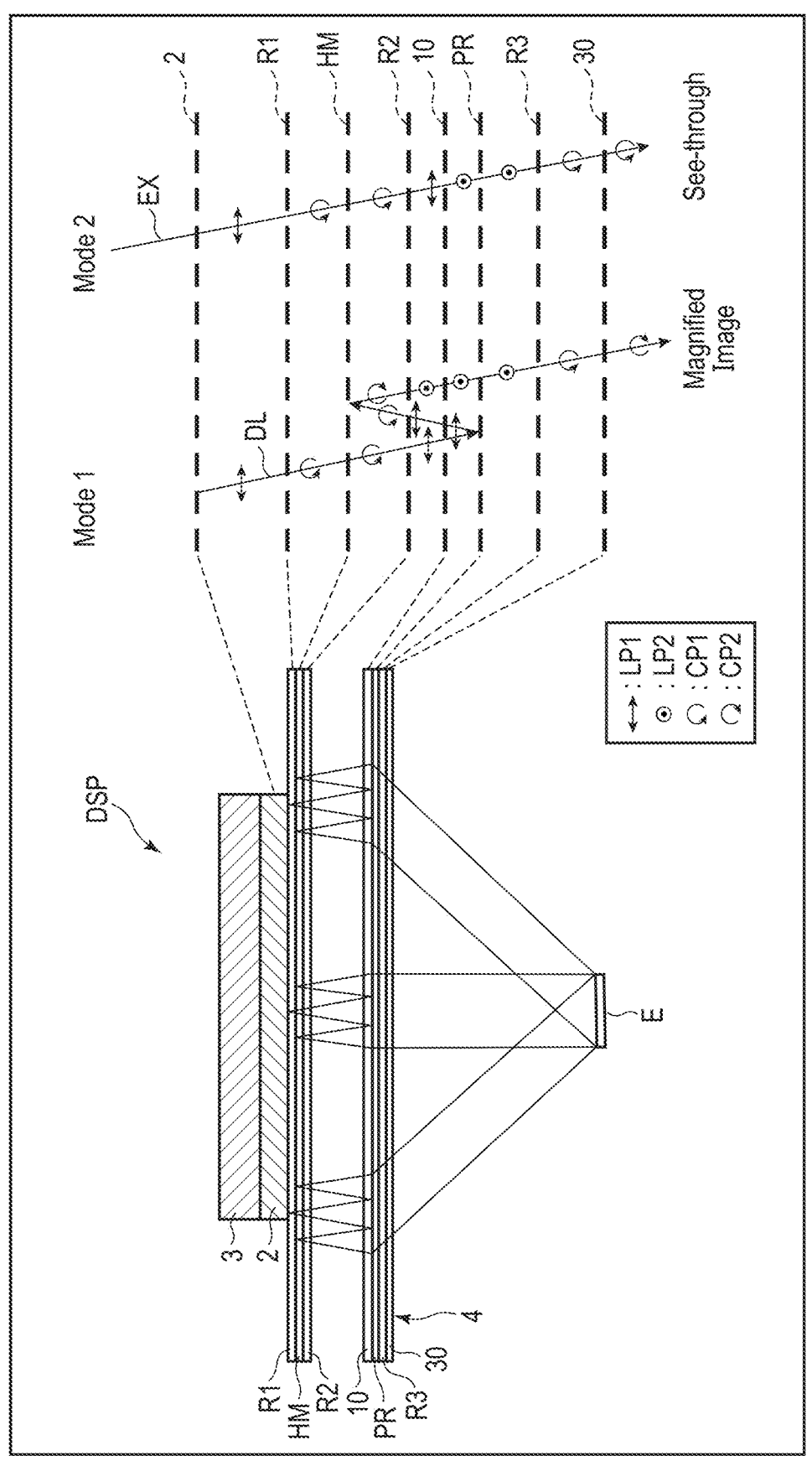
FIG. 17 is a diagram for describing the optical action of the display device DSP.

FIG. 17 is a diagram for describing an optical action of the display device DSP.

A first mode for enlargedly displaying the display light DL is indicated as Mode 1 in the drawing, and a second mode for enabling see-through of the display device DSP is indicated as Mode 2 in the drawing. In the second mode, external light EX is hardly enlarged.

FIG. 18 is a diagram illustrating modes of the display panel 2, the illumination device 3, the polarization conversion element 10, and the lens element 30 in the first mode and the second mode.

First, the first mode will be described.

In the first mode, the illumination device 3 is set to the turn-on mode, the display panel 2 is set to the display mode, the polarization conversion element 10 is set to the non-conversion mode, and the lens element 30 is set to the lens mode.

The display panel 2 emits display light DL of first linearly polarized light LP1. The display light DL is transmitted through the first retardation film R1 and is converted into the first circularly polarized light CP1.

Of the first circularly polarized light CP1 transmitted through the first retardation film R1, a part of the first circularly polarized light CP1 is transmitted through the half mirror HM. The first circularly polarized light CP1 transmitted through the half mirror HM is transmitted through the second retardation film R2 and is converted into the first linearly polarized light LP1.

The first linearly polarized light LP1 transmitted through the second retardation film R2 is transmitted through the polarization conversion element 10 set to the non-conversion mode, and is reflected by the reflection polarizer PR. The first linearly polarized light LP1 reflected by the reflection polarizer PR is transmitted through the polarization conversion element 10, is transmitted through the second retardation film R2, and is converted into the first circularly polarized light CP1.

Of the first circularly polarized light CP1 transmitted through the second retardation film R2, a part of the first circularly polarized light CP1 is reflected by the half mirror HM. When the first circularly polarized light CP1 is reflected by the half mirror HM, the first circularly polarized light CP1 is converted into the second circularly polarized light CP2. The second circularly polarized light CP2 reflected by the half mirror HM is transmitted through the second retardation film R2 and is converted into the second linearly polarized light LP2.

The second linearly polarized light LP2 transmitted through the second retardation film R2 is transmitted through the polarization conversion element 10, is transmitted through the reflection polarizer PR, is further transmitted through the third retardation film R3, and is converted into the first circularly polarized light CP1. The first circularly polarized light CP1 transmitted through the third retardation film R3 is converted into the second circularly polarized light CP2 in the lens element 30 set to the lens mode, and is condensed on the pupil E of the user by the lens action.

Next, the second mode will be described.

In the second mode, the illumination device 3 is set to the turn-off mode, the display panel 2 is set to the transmission mode, the polarization conversion element 10 is set to the conversion mode, and the lens element 30 is set to the non-lens mode.

A part of the external light EX transmitted through the illumination device 3 (light guide LG) is transmitted through the second polarizer PL2 of the display panel 2 set to the transmission mode. The external light EX transmitted through the display panel 2 is the first linearly polarized light LP1. The external light EX is transmitted through the first retardation film R1 and is converted into the first circularly polarized light CP1.

Of the first circularly polarized light CP1 transmitted through the first retardation film R1, a part of the first circularly polarized light CP1 is transmitted through the half mirror HM and is transmitted through the second retardation film R2. The first circularly polarized light CP1 is transmitted through the second retardation film R2 and is converted into the first linearly polarized light LP1.

When the first linearly polarized light LP1 transmitted through the second retardation film R2 is transmitted through the polarization conversion element 10 set to the conversion mode, the polarization direction is rotated to be converted into the second linearly polarized light LP2. The second linearly polarized light LP2 transmitted through the polarization conversion element 10 is transmitted through the reflection polarizer PR.

The second linearly polarized light LP2 transmitted through the reflection polarizer PR is transmitted through the third retardation film R3 and is converted into the first circularly polarized light CP1. The first circularly polarized light CP1 transmitted through the third retardation film R3 is converted into the second circularly polarized light CP2 in the lens element 30 set to the non-lens mode, and is transmitted with almost no lens action.

In other words, the external light EX reaches the pupil E of the user with almost no lens action in the optical system 4. The above case means that the see-through of the display device DSP is enabled.

In Configuration Example 3, as in Configuration Example 1, it is also possible to provide the display device DSP that enables the enlarged display of the image displayed on the display panel 2 in the first mode and enables the see-through in the second mode.

Incidentally, the first linearly polarized light LP1 described with reference to FIG. 17 may be replaced with the second linearly polarized light LP2, or the first circularly polarized light CP1 may be replaced with the second circularly polarized light CP2.

Configuration Example 4

Figure 19:
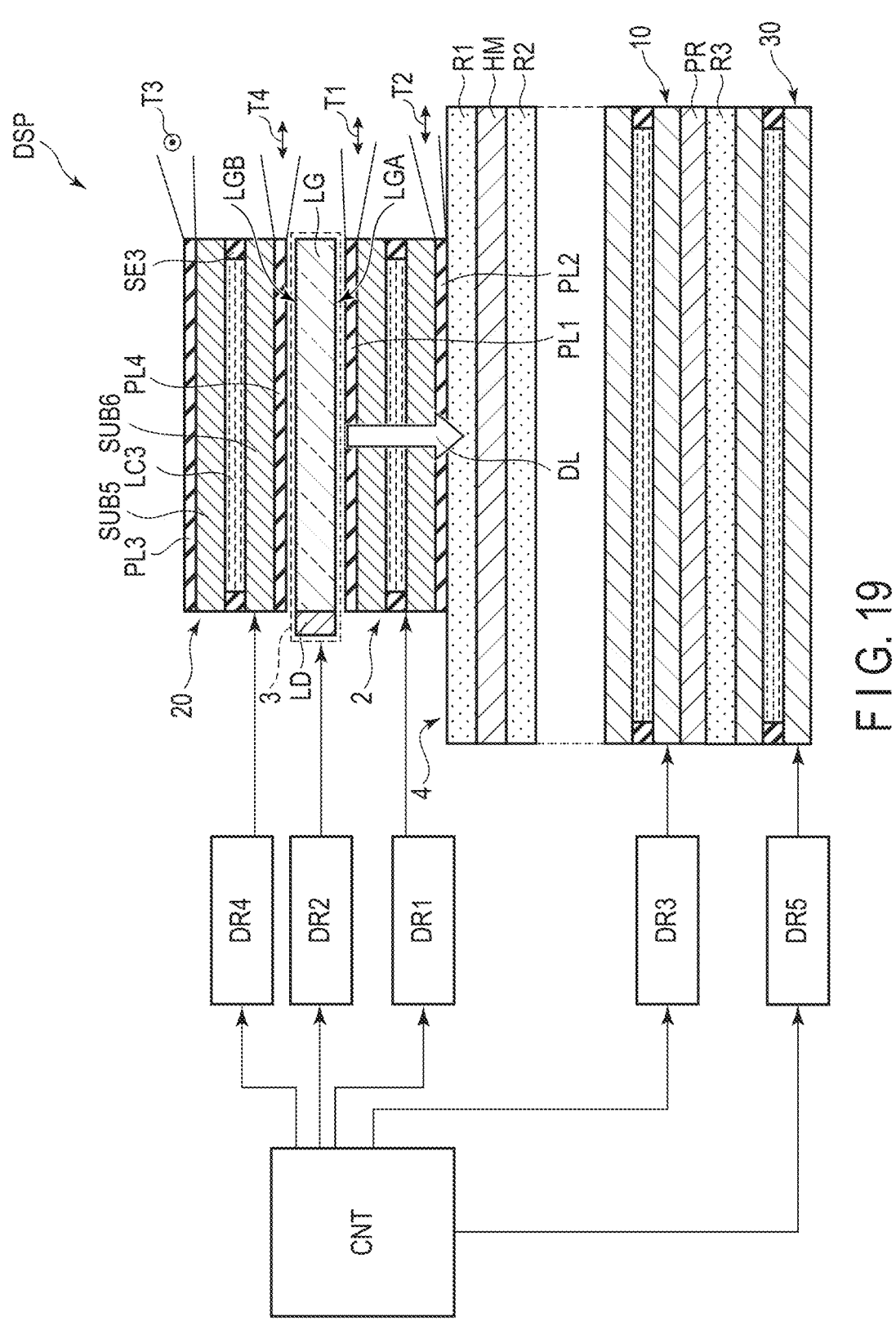
FIG. 19 is a cross-sectional view illustrating Configuration Example 4 of a display device DSP.

FIG. 19 is a cross-sectional view illustrating Configuration Example 4 of the display device DSP.

Configuration Example 4 illustrating in FIG. 19 is different from Configuration Example 3 illustrating in FIG. 14 in that the shutter element 20 opposed to the light guide LG is added.

The display panel 2, the illumination device 3, and the optical system 4 including the polarization conversion element 10 has the configuration described in Configuration Example 1.

The shutter element 20 is opposed to a second main surface LGB opposite to the first main surface LGA of the light guide LG. In other words, the light guide LG is located between the display panel 2 and the shutter element 20.

The shutter element 20 is the TN liquid crystal element described with reference to FIG. 11, and includes the fifth substrate SUB5, the sixth substrate SUB6, the third liquid crystal layer LC3, the third polarizer PL3, and the fourth polarizer PL4.

As described above, such a shutter element 20 has the transmission mode for transmitting external light and the non-transmission mode for shielding external light.

A transmission axis T3 of the third polarizer PL3 and a transmission axis T4 of the fourth polarizer PL4 are orthogonal to each other. A transmission axis T1 of the first polarizer PL1 and a transmission axis T4 of the fourth polarizer PL4 are parallel to each other.

The controller CNT is configured to control the first driver DR1, the second driver DR2, the third driver DR3, the fourth driver DR4, and the fifth driver DR5.

The first driver DR1 drives the display panel 2 to switch between a display mode and a transmission mode.

The second driver DR2 drives the illumination device 3 to switch between the turn-on mode synchronized with the display mode and the turn-off mode synchronized with the transmission mode.

The third driver DR3 drives the polarization conversion element 10 to switch between the non-conversion mode synchronized with the display mode and the conversion mode synchronized with the transmission mode.

The fourth driver DR4 drives the shutter element 20 to switch between the non-transmission mode synchronized with the display mode of the display panel 2 and the transmission mode synchronized with the transmission mode of the display panel 2.

The fifth driver DR5 drives the lens element to switch between the lens mode synchronized with the display mode and the non-lens mode synchronized with the transmission mode.

FIG. 20 is a diagram for describing an optical action of the display device DSP.

A first mode for enlargedly displaying the display light DL is indicated as Mode 1 in the drawing, and a second mode for enabling see-through of the display device DSP is indicated as Mode 2 in the drawing. In the second mode, external light EX is hardly enlarged.

FIG. 21 is a diagram illustrating modes of the display panel 2, the illumination device 3, the polarization conversion element 10, the shutter element 20, and the lens element 30 in the first mode and the second mode.

First, the first mode will be described.

In the first mode, the shutter element 20 is set to the non-transmission mode, the illumination device 3 is set to the turn-on mode, the display panel 2 is set to the display mode, the polarization conversion element 10 is set to the non-conversion mode, and the lens element 30 is set to the lens mode.

Since the shutter element 20 is set to the non-transmission mode, the external light EX is shielded by the shutter element 20.

The display panel 2 emits display light DL of first linearly polarized light LP1. The display light DL is transmitted through the first retardation film R1 and is converted into the first circularly polarized light CP1.

Of the first circularly polarized light CP1 transmitted through the first retardation film R1, a part of the first circularly polarized light CP1 is transmitted through the half mirror HM, is transmitted through the second retardation film R2, and is converted into the first linearly polarized light LP1.

The first linearly polarized light LP1 transmitted through the second retardation film R2 is transmitted through the polarization conversion element 10 set to the non-conversion mode, and is reflected by the reflection polarizer PR. The first linearly polarized light LP1 reflected by the reflection polarizer PR is transmitted through the polarization conversion element 10, is transmitted through the second retardation film R2, and is converted into the first circularly polarized light CP1.

Of the first circularly polarized light CP1 transmitted through the second retardation film R2, a part of the first circularly polarized light CP1 is reflected by the half mirror HM. When the first circularly polarized light CP1 is reflected by the half mirror HM, the first circularly polarized light CP1 is converted into the second circularly polarized light CP2. The second circularly polarized light CP2 reflected by the half mirror HM is transmitted through the second retardation film R2 and is converted into the second linearly polarized light LP2.

The second linearly polarized light LP2 transmitted through the second retardation film R2 is transmitted through the polarization conversion element 10, is transmitted through the reflection polarizer PR, is further transmitted through the third retardation film R3, and is converted into the first circularly polarized light CP1. The first circularly polarized light CP1 transmitted through the third retardation film R3 is converted into the second circularly polarized light CP2 in the lens element 30 set to the lens mode, and is condensed on the pupil E of the user by the lens action.

Next, the second mode will be described.

In the second mode, the shutter element 20 is set to the transmission mode, the illumination device 3 is set to the turn-off mode, the display panel 2 is set to the transmission mode, the polarization conversion element 10 is set to the conversion mode, and the lens element 30 is set to the non-lens mode.

Since the shutter element 20 is set to the transmission mode, a part of the external light EX is transmitted through the shutter element 20 and is further transmitted through the illumination device 3 (light guide LG). The external light EX transmitted through the shutter element 20 is the first linearly polarized light LP1 parallel to the transmission axis T4 of the fourth polarizer PL4. The first linearly polarized light LP1 transmitted through the shutter element 20 and the illumination device 3 is parallel to the transmission axis T1 of the first polarizer PL1 of the display panel 2. For this reason, the first linearly polarized light LP1 incident on the display panel 2 is hardly absorbed by the first polarizer PL1.

Since the display panel 2 is set to the transmission mode, the first linearly polarized light LP1 is transmitted through the second polarizer PL2 of the display panel 2. The first linearly polarized light LP1 transmitted through the display panel 2 is transmitted through the first retardation film R1 and is converted into the first circularly polarized light CP1.

A part of the first circularly polarized light CP1 transmitted through the first retardation film R1 is transmitted through the half mirror HM, is transmitted through the second retardation film R2, and is converted into the first linearly polarized light LP1.

When the first linearly polarized light LP1 transmitted through the second retardation film R2 is transmitted through the polarization conversion element 10 set to the conversion mode, the polarization direction is rotated to be converted into the second linearly polarized light LP2. The second linearly polarized light LP2 transmitted through the polarization conversion element 10 is transmitted through the reflection polarizer PR.

The second linearly polarized light LP2 transmitted through the reflection polarizer PR is transmitted through the third retardation film R3 and is converted into the first circularly polarized light CP1. The first circularly polarized light CP1 transmitted through the third retardation film R3 is transmitted through the lens element 30 set to the non-lens mode with almost no lens action. In other words, the external light EX reaches the pupil E of the user with almost no lens action in the optical system 4.

In Configuration Example 4, as in Configuration Example 1, it is also possible to provide the display device DSP that enables the enlarged display of the image displayed on the display panel 2 in the first mode and enables the see-through in the second mode.

In addition, in the first mode, visibility of the enlargedly displayed image can be improved. In addition, in the second mode, it is possible to suppress undesirable absorption of the external light in the display panel 2 of the linearly polarized light transmitted through the shutter element 20.

In Configuration Example 4, as in Configuration Example 2, the light guide LG is desirably made of a transparent medium having substantially zero refractive anisotropy. Consequently, in the second mode, it is possible to suppress the undesirable absorption of the external light EX in the display panel 2.

Incidentally, the first linearly polarized light LP1 described with reference to FIG. 20 may be replaced with the second linearly polarized light LP2, or the first circularly polarized light CP1 may be replaced with the second circularly polarized light CP2.

Modified Example

In Configuration Example 4, the first mode and the second mode illustrated in FIG. 21 are alternately performed in a time division manner, it is possible to provide augmented reality (AR). That is, in the first mode, the image (enlarged image) displayed on the display panel 2 is observed, and in the second mode, a real landscape is observed through the display device DSP. The user can observe the enlarged image superposed on the real landscape.

As described above, according to the present embodiment, it is possible to provide the display device that enables the enlarged display and enables the see-through.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
an illumination device comprising a light guide, and a light emitting element opposed to a side surface of the light guide;
a display panel opposed to a first main surface of the light guide and configured to emit display light of linearly polarized light;
a first retardation film opposed to the display panel;
a holographic optical element opposed to the first retardation film;
a second retardation film opposed to the holographic optical element;
a reflection polarizer spaced apart from the holographic optical element, and configured to transmit first linearly polarized light and reflect second linearly polarized light orthogonal to the first linearly polarized light; and a polarization conversion element located between the second retardation film and the reflection polarizer, and configured to maintain a polarization direction of the display light and rotate a polarization direction of external light transmitted through the light guide.

2. The display device of claim 1, wherein
the polarization conversion element comprises
a third substrate opposed to the second retardation film and including a third transparent electrode,
a fourth substrate opposed to the reflection polarizer and including a fourth transparent electrode, and
a second liquid crystal layer located between the third substrate and the fourth substrate, and containing twist-aligned liquid crystal molecules.

3. The display device of claim 1, wherein
the display panel comprises
a first substrate,
a second substrate,
a first liquid crystal layer located between the first substrate and the second substrate,
a first transparent electrode disposed in each pixel,
a second transparent electrode disposed over a plurality of pixels,
a first polarizer located between the first substrate and the light guide, and
a second polarizer located between the second substrate and the first retardation film, and
the display panel is configured to transmit the external light in a state where an electric field is not formed in the first liquid crystal layer.

4. The display device of claim 3, further comprising a shutter element opposed to a second main surface opposite to the first main surface of the light guide, and configured to be able to switch between transmission and non-transmission of the external light.

5. The display device of claim 4, wherein
the shutter element comprises
a fifth substrate including a fifth transparent electrode,
a sixth substrate including a sixth transparent electrode,
a third liquid crystal layer located between the fifth substrate and the sixth substrate, and containing twist-aligned liquid crystal molecules,
a third polarizer opposed to the fifth substrate, and
a fourth polarizer located between the sixth substrate and the light guide, and
a transmission axis of the fourth polarizer is orthogonal to a transmission axis of the third polarizer and is parallel to a transmission axis of the first polarizer.

6. The display device of claim 1, wherein the first retardation film and the second retardation film are quarter-wave plates.

7. The display device of claim 1, wherein the light guide has substantially zero refractive anisotropy.

8. A display device comprising:
an illumination device including a light guide, and a light emitting element opposed to a side surface of the light guide;
a display panel opposed to a first main surface of the light guide and configured to emit display light of linearly polarized light;
a first retardation film opposed to the display panel;
a half mirror opposed to the first retardation film;
a second retardation film opposed to the half mirror;
a reflection polarizer spaced apart from the half mirror, and configured to transmit first linearly polarized light and reflect second linearly polarized light orthogonal to the first linearly polarized light;

a polarization conversion element located between the second retardation film and the reflection polarizer, and configured to maintain a polarization direction of the display light and rotate a polarization direction of external light transmitted through the light guide;

a third retardation film opposed to the reflection polarizer; and a lens element opposed to the third retardation film, configured to condense first circularly polarized light which is the display light transmitted through the third retardation film, and configured to transmit the first circularly polarized light which is the external light transmitted through the third retardation film without condensing the first circularly polarized light.

9. The display device of claim 8, wherein
the polarization conversion element comprises
a third substrate opposed to the second retardation film and including a third transparent electrode,
a fourth substrate opposed to the reflection polarizer and including a fourth transparent electrode, and
a second liquid crystal layer located between the third substrate and the fourth substrate, and containing twist-aligned liquid crystal molecules.

10. The display device of claim 8, wherein
the display panel comprises
a first substrate,
a second substrate,
a first liquid crystal layer located between the first substrate and the second substrate,
a first transparent electrode disposed in each pixel,
a second transparent electrode disposed over a plurality of pixels,
a first polarizer located between the first substrate and the light guide, and
a second polarizer located between the second substrate and the first retardation film, and
the display panel is configured to transmit the external light in a state where an electric field is not formed in the first liquid crystal layer.

11. The display device of claim 10, further comprising a shutter element opposed to a second main surface opposite to the first main surface of the light guide, and configured to be able to switch between transmission and non-transmission of the external light.

12. The display device of claim 11, wherein
the shutter element comprises
a fifth substrate including a fifth transparent electrode,
a sixth substrate including a sixth transparent electrode,
a third liquid crystal layer located between the fifth substrate and the sixth substrate, and containing twist-aligned liquid crystal molecules,
a third polarizer opposed to the fifth substrate, and
a fourth polarizer located between the sixth substrate and the light guide, and
a transmission axis of the fourth polarizer is orthogonal to a transmission axis of the third polarizer and is parallel to a transmission axis of the first polarizer.

13. The display device of claim 8, wherein the first retardation film, the second retardation film, and the third retardation film are quarter-wave plates.

14. The display device of claim 8, wherein the light guide has substantially zero refractive anisotropy.

15. The display device of claim 8, wherein the lens element comprises a seventh substrate opposed to the third retardation film and including a seventh transparent electrode, an eighth substrate including an eighth transparent electrode, and a fourth liquid crystal layer located between the seventh substrate and the eighth substrate, and containing liquid crystal molecules, the fourth liquid crystal layer in a state where an electric field is not formed includes, in plan view, a first annular region where a plurality of first liquid crystal molecules are aligned in an identical direction and a second annular region where a plurality of second liquid crystal molecules are aligned in an identical direction outside the first annular region, and the direction of alignment of the first liquid crystal molecules is different from the direction of alignment of the second liquid crystal molecules.

* * * * *